United States Patent
Asahi et al.

(10) Patent No.: US 10,338,276 B2
(45) Date of Patent: Jul. 2, 2019

(54) ANTIREFLECTIVE FILM, POLARIZING PLATE, COVER GLASS, IMAGE DISPLAY DEVICE, AND METHOD OF MANUFACTURING ANTIREFLECTIVE FILM

(71) Applicant: FUJIFILM Corporation, Tokyo (JP)

(72) Inventors: Miho Asahi, Kanagawa (JP); Kazuo Kamohara, Kanagawa (JP); Shuntaro Ibuki, Kanagawa (JP); Ayako Matsumoto, Kanagawa (JP); Daiki Wakizaka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/851,722

(22) Filed: Sep. 11, 2015

(65) Prior Publication Data

US 2016/0077239 A1     Mar. 17, 2016

(30) Foreign Application Priority Data

Sep. 12, 2014 (JP) .................. 2014-186789
Sep. 30, 2014 (JP) .................. 2014-200055

(51) Int. Cl.
*G02B 1/14* (2015.01)
*G02B 5/30* (2006.01)
(Continued)

(52) U.S. Cl.
CPC .............. *G02B 1/118* (2013.01); *G02B 1/111* (2013.01); *G02B 1/14* (2015.01); *G02B 5/3033* (2013.01)

(58) Field of Classification Search
CPC .......... G02B 1/10; G02B 1/105; G02B 1/111; G02B 1/118; G02B 1/14; G02B 5/30;
(Continued)

(56) References Cited

U.S. PATENT DOCUMENTS 5,759,643 A * 6/1998 Miyashita ............... C03C 17/42
428/1.31
2005/0180009 A1   8/2005 Chuang et al.
(Continued)

FOREIGN PATENT DOCUMENTS

JP    H07-098401 A    4/1995
JP    H07-168006 A    7/1995
(Continued)

OTHER PUBLICATIONS

Notification of Reasons for Refusal issued by the Japanese Patent Office (JPO) dated May 9, 2017, in connection with corresponding Japanese Patent Application No. 2014-200055.
(Continued)

*Primary Examiner* — Stephone B Allen
*Assistant Examiner* — Adam W Booher
(74) *Attorney, Agent, or Firm* — Edwards Neils, LLC; Jean C. Edwards, Esq.

(57) ABSTRACT

There is provided an antireflective film, including: a plastic substrate; a infiltration layer; and an antireflective layer containing metallic oxide fine particles with an average primary particle diameter of 50 nm to 250 nm and a viscosity increasing compound, in this order, wherein the infiltration layer contains a polymer of a (meth)acrylate compound having a molecular weight of 400 or less, and the antireflective layer has a moth-eye structure including an uneven shape formed by the metallic oxide fine particles.

28 Claims, 3 Drawing Sheets

(51) Int. Cl.
*G02B 1/111* (2015.01)
*G02B 1/118* (2015.01)

(58) Field of Classification Search
CPC .. G02B 5/3025; G02B 5/3033; G02B 5/3041; G02B 5/305; G02B 5/02; G02B 5/0205; G02B 5/021; G02B 5/0226; G02B 5/0273; G02B 5/0294
See application file for complete search history.

(56) References Cited

U.S. PATENT DOCUMENTS

| | | | |
|---|---|---|---|
| 2008/0138606 | A1 | 6/2008 | Yoshihara et al. |
| 2008/0221290 | A1* | 9/2008 | Horio .................. C08F 26/02 526/302 |
| 2011/0267698 | A1 | 11/2011 | Guilfoyle et al. |
| 2012/0134024 | A1 | 5/2012 | Lander et al. |
| 2012/0176681 | A1 | 7/2012 | Chang et al. |
| 2012/0281292 | A1 | 11/2012 | Baca et al. |
| 2013/0107370 | A1 | 5/2013 | Lander et al. |
| 2013/0115441 | A1 | 5/2013 | Bookbinder et al. |
| 2013/0215514 | A1 | 8/2013 | Kim et al. |
| 2013/0216729 | A1 | 8/2013 | Kim et al. |
| 2013/0216817 | A1 | 8/2013 | Kim et al. |
| 2013/0216818 | A1 | 8/2013 | Kim et al. |
| 2013/0216819 | A1 | 8/2013 | Kim et al. |
| 2013/0222915 | A1* | 8/2013 | Kim .................. B32B 7/02 359/601 |
| 2013/0323468 | A1 | 12/2013 | Myers et al. |
| 2014/0022644 | A1* | 1/2014 | Hao .................. G02B 1/111 359/586 |
| 2015/0062713 | A1* | 3/2015 | Hart .................. G02B 1/118 359/601 |
| 2015/0064405 | A1 | 3/2015 | Koch, III et al. |
| 2015/0175478 | A1 | 6/2015 | Ravichandran et al. |
| 2015/0198752 | A1 | 7/2015 | Lander et al. |
| 2015/0299035 | A1 | 10/2015 | Kuksenkov |
| 2016/0355689 | A1 | 12/2016 | Lander et al. |

FOREIGN PATENT DOCUMENTS

| | | |
|---|---|---|
| JP | 2005-250309 A | 9/2005 |
| JP | 2005-313593 A | 11/2005 |
| JP | 2006-145736 A | 6/2006 |
| JP | 2007-245454 A | 9/2007 |
| JP | 2009-139796 A | 6/2009 |
| JP | 2009-215088 A | 9/2009 |
| JP | 2010-082860 A | 4/2010 |
| JP | 2011-002759 A | 1/2011 |
| JP | 2012-145748 A | 8/2012 |
| JP | 2013-068921 A | 4/2013 |
| JP | 2014-520056 A | 8/2014 |
| WO | 2013/032120 A1 | 3/2013 |

OTHER PUBLICATIONS

Notification of Reasons for Refusal issued by the Japanese Patent Office (JPO) dated Jul. 4, 2017, in connection with corresponding Japanese Patent Application No. 2014-186789.

Notification of Reasons for Refusal issued by the Japanese Patent Office (JPO) dated Nov. 21, 2017, in connection with corresponding Japanese Patent Application No. 2014-200055.

Notification of Reasons for Refusal issued by the Japanese Patent Office (JPO) dated Apr. 3, 2018, in connection with corresponding Japanese Patent Application No. 2014-186789.

Notification of Reasons for Refusal issued by the Japanese Patent Office (JPO) dated Dec. 4, 2018, in connection with corresponding Japanese Patent Application No. 2014-186789.

* cited by examiner

ANTIREFLECTIVE FILM, POLARIZING PLATE, COVER GLASS, IMAGE DISPLAY DEVICE, AND METHOD OF MANUFACTURING ANTIREFLECTIVE FILM

CROSS REFERENCE TO RELATED APPLICATION(S)

This application claims priority from Japanese Patent Application Nos. 2014-186789 filed on Sep. 12, 2014, and 2014-200055 filed on Sep. 30, 2014, the entire disclosures of which are incorporated herein by reference.

BACKGROUND

1. Technical Field

The present invention relates to an antireflective film, a polarizing plate, a cover glass, an image display device, and a method of manufacturing an antireflective film.

2. Background Art

In an image display device such as a cathode ray tube display (CRT), a plasma display (PDP), an electroluminescence display (ELD), a fluorescent display (VFD), a field emission display (FED), and a liquid crystal display (LCD), an antireflective film is provided in order to prevent contrast reduction or glare of the image due to the reflection of external lights on the surface of the display.

As the antireflective film, an antireflective film has been known, which includes, on a substrate surface, a fine unevenness shape in which a period is shorter than the wavelength of the visible light, that is, an antireflective layer having a so-called moth-eye structure. By the moth-eye structure, a refractive index gradient layer whose refractive index is varied continuously from the air towards a bulk material inside the substrate is artificially produced, so that reflection of light may be prevented.

As an antireflective film having the moth-eye structure, Japanese Patent Laid-Open Publication No. 2009-139796 (hereinafter JP-A-2009-139796) discloses an antireflective film having a moth-eye structure formed by coating a coating liquid containing a transparent resin monomer and fine particles on a transparent substrate, curing the coating liquid to form a transparent resin dispersed with the fine particles, and then, etching the transparent resin.

Japanese Patent Laid-Open Publication No. 2011-002759 (hereinafter JP-A-2011-002759) discloses an antireflective film having a moth-eye structure obtained by polymerizing a (meth)acrylic polymerizable composition containing a urethane (meth)acrylate and an ester (meth)acrylate.

Japanese Patent Laid-Open Publication No. 2006-145736 (hereinafter JP-A-2006-145736) discloses an antiglare-antireflective film including an antiglare layer having a uneven shape on a transparent substrate and a low refractive index layer having hollow silica particle on the antiglare layer. Such an antiglare-antireflective film, which includes, at the outermost surface, a low refractive index layer, which is a thin layer with a thickness of 200 nm or less, may prevent reflection of light by optical interference of the low refractive index layer and also improve strength of the outermost layer.

However, in JP-A-2009-139796 and JP-A-2011-002759, it is necessary to etch a transparent resin or forming a transparent resin by molding, a manufacturing process for an antireflective film is complicated in some cases. Also, in JP-A-2011-002759, a hard material is not applicable, and therefore scratch resistance becomes insufficient in some cases.

JP-A-2009-139796 also has a problem that a sufficient hardness cannot be obtained, in addition to the above problem in manufacturing process. An antireflective film disclosed in JP-A-2006-145736 does not have a moth-eye structure, and is required to further improve antireflective property.

An objective of the present invention is to provide an antireflective film having a low reflectance, no white turbidity, a high hardness, and an excellent scratch resistance, and a simple method of manufacturing such an antireflective film. Another objective of the present invention is to provide a polarizing plate, a cover glass and an image display device which include the antireflective film.

The present inventors have studied formation of a moth-eye structure without etching or forming by molding. Although they tried to form a layer having a moth-eye structure simply by coating, on a substrate, a composition (coating liquid) containing particles, and a binder resin or a binder resin forming compound, and curing the composition, but they have found the following problems (1) and (2).

(1) When a content of particles is high and a content of a binder resin or a binder resin forming compound is low before the coating, until completion of forming a film, the particles are aggregated, and a fine unevenness structure (moth-eye structure) cannot be formed. As a result, an antireflection property may disappear. Also, the particles are excessively aggregated, the aggregated portion functions as a scatter so that a film becomes white turbidity and a haze occurs. As a result, a contrast is deteriorated and a beautiful black tightness of a display due to an antireflective film is impaired.

(2) When a content of particles is low and a content of a binder resin or a binder resin forming compound is high after the coating, the particles are embedded into the binder resin or the binder resin forming compound so that an uneven shape is not formed and sufficient antireflective property is not obtained.

As a result of intensive study of the present inventors, it has been found that: when a low molecule monomer which easily permeates into a substrate or an under layer and a compound (viscosity increasing compound) which tends to prevent aggregation of particles are contained into a coating liquid for forming an antireflective layer, aggregation of particles may be prevented; by such a configuration, when a formation of a film is completed, a height of a convex portion and a distance between convex portions in an unevenness structure formed by the particles due to infiltration of the low molecule monomer can be suitably adjusted; and as a result, a moth-eye structure, which has a low reflective property, excellent uniformity on the surface, and excellent scratch resistance, is easily formed.

When infiltration of the low molecular monomer occurs, a content ratio of particles in a coating film becomes relatively high, and therefore if a viscosity increasing compound is not contained, the particles may be aggregated in the time between the coating a coating liquid and the completion of forming of a film. By viscosity-increasing effect of the viscosity increasing compound, aggregation of the particles is prevented, and even if the content ratio of particles in a coating film becomes relatively high, the particles are protruded from the film without aggregation of the particles and a desired unevenness structure may be obtained.

This effect cannot be obtained simply by heightening a solid concentration of a coating liquid for forming an antireflective film and by heightening viscosity of the coating liquid. This reason is presumed that after coating the coating liquid, a solvent is volatilized by drying, the low molecular monomer continuously permeates into the substrate or the under layer, and a content ratio of the particles in the coating film becomes relatively high and as a result, aggregation of particles cannot be prevented.

Further, the present inventors have studied that a moth-eye structure is formed without performing etching and that a high hardness is imparted.

The present inventors formed an antireflective film having a hard coat layer on a substrate and an antireflective layer having a moth-eye structure by coating, on the hard coat layer, a composition for forming an antireflective layer, containing particles and a binder resin forming compound, and curing the composition, and have found that when affinity of the binder resin forming compound with the particles is excessively high, a binder resin is filled into gaps between the particles, and a moth-eye structure is not formed and a reflectance becomes high. The present inventors have also found that when wettability of the binder resin forming compound with the particles is low, cissing occurs and a binder resin in the antireflective layer is not uniformly formed, and a reflectance becomes high.

That is, it is found that even when an antireflective layer having a moth-eye structure is simply formed on a hard coat layer, a reflectance becomes high.

The present inventors have further studied these problems and have found that these problems can be solved by using an antireflective layer on a hard coat layer, the antireflective layer having a moth-eye structure, wherein with respect to the particle constituting the moth-eye structure, an average primary particle diameter, a particle occupancy, an average value and a standard deviation of distance of a convex portion and a concave portion are suitably controlled.

That is, the above problems are solved by the following configurations.

SUMMARY (1) An antireflective film, including:
a plastic substrate;
an infiltration layer; and
an antireflective layer containing metallic oxide fine particles with an average primary particle diameter of 50 nm to 250 nm and a viscosity increasing compound, in this order,
wherein the infiltration layer contains a polymer containing a (meth)acrylate compound having a molecular weight of 400 or less, and
the antireflective layer has a moth-eye structure including an uneven shape formed by the metallic oxide fine particles.

(2) The antireflective film according to (1),
wherein the antireflective layer further contains a binder resin.

(3) The antireflective film according to (1),
wherein the viscosity increasing compound has a function of a binder resin as well.

(4) The antireflective film according to any one of (1) to (3),
wherein the infiltration layer further contains the viscosity increasing compound.

(5) The antireflective film according to (4),
wherein a concentration of the viscosity increasing compound in the infiltration layer is lower than one in the antireflective layer.

(6) The antireflective film according to any one of (1) to (5),
wherein the uneven shape of the antireflective layer satisfies a B/A ratio of 0.6 or more, A represents a distance between apexes of adjacent convex portions, and
B represents a distance between a concave portion and a middle between apexes of adjacent convex portions.

(7) The antireflective film according to any one of (1) to (6),
wherein the metallic oxide fine particles consists of metallic oxide fine particles that has an average primary particle size of 50 nm to 250 nm.

(8) The antireflective film according to any one of (1) to (7),
wherein the viscosity increasing compound is a urethane compound.

(9) The antireflective film according to (8),
wherein the urethane compound is a four or more functional urethane (meth)acrylate.

(10) The antireflective film according to any one of (1) to (9),
wherein the viscosity increasing compound has a viscosity of 15 to 100,000 mPa·s at 100° C.

(11) The antireflective film according to any one of (1) to (10),
wherein the plastic substrate is a substrate containing cellulose acylate.

(12) The antireflective film according to any one of (1) to (11),
wherein the metallic oxide fine particles are silica particles.

(13) The antireflective film according to any one of (1) to (12),
wherein the metallic oxide fine particle has an indentation hardness of 400 MPa or more.

(14) The antireflective film according to any one of (1) to (13),
wherein the metallic oxide fine particles consists of pyrogenic silica particles surface-modified with a compound having a (meth)acryloyl group.

(15) The antireflective film according to any one of (6) to (14),
wherein a distribution of the distance A has a half width of 200 nm or less.

(16) An antireflective film, including:
a substrate;
a hard coat layer; and
an antireflective layer containing metallic oxide fine particles with an average primary particle diameter of 50 nm to 380 nm and a binder resin, in this order,
wherein the hard coat layer and the antireflective layer are in contact with each other,
the antireflective layer has a moth-eye structure constituted by an uneven shape formed by the metallic oxide fine particles,
a particle occupancy at a surface of the antireflective layer is 40% to 90%, and
the uneven shape satisfies formulae (2) and (3):

$$R/2 \leq K \leq 9R/10 \qquad \text{formula (2)}$$

$$\sigma \leq 40 \qquad \text{formula (3),}$$

wherein K represents an average value of a distance B between a middle of apexes of adjacent convex portions and a concave portion,
σ represents a standard deviation of a distribution of the distance B, and
R represents an average primary particle diameter of the metallic oxide fine particles.

(17) The antireflective film according to (16), which satisfies formulae (4) and (5):

$$-120M+130 \geq L \quad \text{Formula (4)}$$

$$L \leq 50° \quad \text{Formula (5)}$$

wherein when the metallic oxide fine particles are dispersed in 11 kinds of ethanol/acetone mixed solvent varying a mass ratio of ethanol to a whole mixed solvent from 0 to 1 by 0.1, M represents a mass ratio of ethanol to the whole mixed solvent in a mixed solvent in which precipitation of the metallic oxide fine particles is the slowest, and L represents a water contact angle to the hard coat layer.

(18) The antireflective film according to (16) or (17), wherein a water contact angle to the binder resin in the antireflective layer is 90° or more.

(19) The antireflective film according to any one of (16) to (18), wherein the metallic oxide fine particles are metallic oxide fine particles surface-modified with a compound having at least one substituent selected from the group consisting of an alkyl group, a (meth)acryloyl group, organosiloxane and a fluorine atom.

(20) The antireflective film according to any one of (16) to (19), wherein the metallic oxide fine particles are silica particles.

(21) The antireflective film according to any one of (16) to (20), wherein the metallic oxide fine particles are pyrogenic silica particles.

(22) A polarizing plate including:

a polarizer; and at least one protective film for protecting the polarizer, wherein the at least one protective film is the antireflective film according to any one of (1) to (21).

(22) A cover glass including, as a protective film, the antireflective film according to any one of (1) to (21).

(23) An image display device including the antireflective film according to any one of (1) to (21).

(24) A method of manufacturing an antireflective film including a plastic substrate, an infiltration layer, and an antireflective layer containing metallic oxide fine particles with an average primary particle diameter of 50 nm to 250 nm and a viscosity increasing compound, in this order, wherein the antireflective layer has a moth-eye structure constituted by an uneven shape formed by the metallic oxide fine particles at a surface opposite to the interface with the plastic substrate, the method including:

coating a composition for forming antireflective layer, containing a viscosity increasing compound, a (meth)acrylate compound having a molecular weight of 400 or lower, metallic oxide fine particles with an average primary particle diameter of 50 nm to 250 nm, and a solvent, on the plastic substrate or a functional layer provided on the plastic substrate;

infiltrating the (meth)acrylate compound into the plastic substrate or the functional layer on the plastic substrate to protrude the metallic oxide fine particles from the surface opposite to the interface with the plastic substrate; and polymerizing the (meth)acrylate compound to form the infiltration layer containing the (meth)acrylate compound and the antireflective layer having the moth-eye structure formed by the metallic oxide fine particles.

(25) The method of manufacturing the antireflective film according to (24), wherein the composition for forming antireflective layer has a viscosity of 15 to 100 mPa·s at 100° C.

(26) A method of manufacturing an antireflective film including a substrate, a hard coat layer and an antireflective layer containing metallic oxide fine particles with a primary particle diameter of 50 nm to 380 nm and a binder resin, in this order, wherein the hard coat layer and the antireflective layer are in contact with each other, the antireflective layer has a moth-eye structure constituted by an uneven shape formed by the metallic oxide fine particles, a particle occupancy rate at a surface of the antireflective layer is 40% to 90%, and the uneven shape satisfies formulae (2) and (3):

$$R/2 \leq K \leq 9R/10 \quad \text{formula (2)}$$

$$\sigma \leq 40 \quad \text{formula (3),}$$

wherein K represents an average value of a distance B between a middle of apexes of adjacent convex portions and a concave portion, σ represents a standard deviation of a distribution of the distance B, and R represents an average primary particle diameter of the metallic oxide fine particles, the method including:

forming the hard coat layer on the substrate; and coating, on the hard coat layer, a composition for forming antireflective layer containing the metallic oxide particles with an average primary particle diameter of 50 nm to 380 nm and a binder resin forming compound, and curing the composition to form the antireflective layer.

According to an example of the present invention, there is provided an antireflective film having a low reflectance, no white turbidity, a high hardness, and an excellent scratch resistance, and a simple method of manufacturing such an antireflective film. Another objective of the present invention is to provide a polarizing plate, a cover glass and an image display device which include the antireflective film.

DETAILED DESCRIPTION OF EXEMPLARY EMBODIMENTS

The following explanation is based on a representative embodiment of the present invention, but the present invention is not limited to the representative embodiment. Also, in a numerical range represented by using "to" in the present application, numerical values front and behind of "to" mean the lower limit value and the upper limit value, respectively.

An antireflective film of a first aspect in the present invention will be explained below.

[Antireflective Film]

An antireflective film of the first aspect in the present invention includes a plastic substrate, a infiltration layer, metallic oxide fine particles having an average primary particle diameter of 50 nm to 250 nm, and an antireflective layer containing a viscosity increasing compound, in this order. The infiltration layer contains a polymer of (meth)acrylate compounds with a molecular weight of 400 or less, and the antireflective layer has a moth-eye structure constituted by an uneven shape formed by the metallic oxide fine particles.

Figure 1:
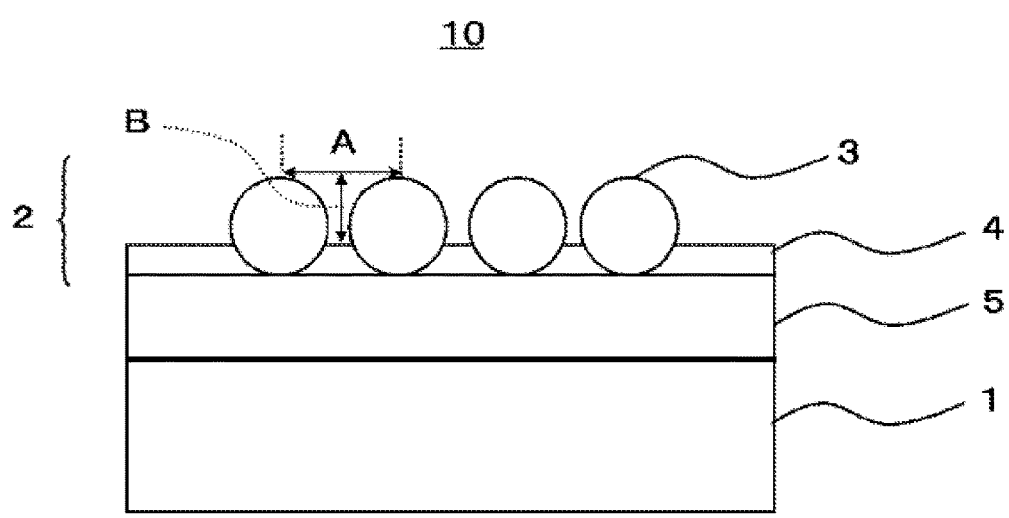
FIG. 1 is a schematic view illustrating an exemplary antireflective film of a first aspect in the present invention.

FIG. 1 shows a preferable embodiment of the antireflective film of the first aspect in the present invention.

The antireflective film 10 of FIG. 1 includes the plastic substrate 1, the infiltration layer 5, and the antireflective layer 2. The antireflective layer 2 has a moth-eye structure constituted by an uneven shape formed by the metallic oxide fine particles 3 at a surface opposite to the interface with the infiltration layer 5.

The antireflective layer 2 contains the metallic oxide fine particles 3 and a viscosity increasing compound, and the viscosity increasing compound is preferably contained in the binder resin 4. As described later, the viscosity increasing compound may function as a binder resin as well.

(Moth-Eye Structure)

The antireflective layer has a moth-eye structure constituted by an uneven shape formed by the metallic oxide fine particle at a surface opposite to the interface with the infiltration layer.

Here, the moth-eye structure is a processed surface of substance (material) for suppressing reflection of light, and refers to a structure having a periodic microstructured pattern. Particularly, for the purpose of suppressing reflection of visible light, the moth-eye structure refers to a structure having a microstructured pattern with a period less than 780 nm. When the period of the microstructured pattern is less than 380 nm, it is preferred in that the coloring of the reflected light disappears. Further, when the period is 100 nm or more, the microstructured pattern may not be recognized by light having a wavelength of 380 nm. Therefore, it is preferred in that the antireflection is excellent. The presence of the moth-eye structure may be confirmed by observing the surface shape with a scanning electron microscope (SEM) or an atomic force microscope (AFM).

In an uneven shape of the antireflective layer in the antireflective film of the first aspect in the present invention, a distance A between apexes of adjacent convex portions and a distance B between a concave portion and the middle between apexes of adjacent convex portions preferably satisfy B/A of 0.6 or more. When B/A is 0.6 or more, a refractive index gradient layer whose refractive index is varied more gradually from the air towards the inside of the antireflective layer is artificially produced, so that reflectance may be further reduced.

The ratio, B/A, can be controlled by suitably adjusting an amount of the metallic oxide fine particles, the viscosity increasing compound, a (meth)acrylate compound having a molecular weight of 400 or less. Therefore, it is preferable that a blending ratio of the metallic oxide fine particles, the viscosity increasing compound, a (meth)acrylate compound having a molecular weight of 400 or less is suitably designed. By infiltration of the viscosity increasing compound and the (meth)acrylate compound having a molecular weight of 400 or less into the substrate or the under layer (the functional layer provided on the plastic substrate), or volatilization thereof in a process for forming a moth-eye structure, a volume rate of the viscosity increasing compound and the metallic oxide fine particles in the antireflective layer varies from a blending ratio in the composition for forming an antireflective layer in some cases. Therefore, it is preferable that a combination with the substrate is suitably designed.

In order to set B/A to be 0.6 or more and reduce an reflectance, it is preferable that the metallic oxide fine particles forming convex portions are arranged uniformly with a high filling ratio, but the filling ratio is preferably not too high. The filling ratio is also called particle occupancy. This is because when the filling ratio is too high, adjacent particles are in contact with each other so that the ratio, B/A, of the unevenness in the moth-eye structure becomes low. From the above viewpoint, it is preferred that the content of the particles forming the convex portions is adjusted to be uniform through the whole antireflective layer. The filling ratio may be measured as an area occupancy rate of the particles located closest to the surface side when the particles forming the convex portion from the surface, by SEM, and is preferably 30% to 95%, more preferably 40 to 90%, and still more preferably 50 to 85%.

Methods for measuring the distance A between the apexes of adjacent convex portions and the distance B between a concave portion and the middle between apexes of adjacent convex portions will be specifically explained as follows.

The distance B may be measured by observing a cross section of the antireflective film with SEM. The SEM observation is performed by cutting an antireflective film sample with a microtome to expose the cross section thereof and observing that with a suitable magnification (around magnification of 5,000). In order to facilitate the observation, the sample may be subjected to a suitable treatment, such as carbon vapor deposition and etching. The distance B represents a distance from a line passing the apexes of adjacent convex portion in a surface perpendicular to a substrate surface to the concave portion, which is a point where the perpendicular bisector of the line reaches a particle or a binder resin, and an average value K of values at 100 points is calculated.

In a SEM image, the distance A and the distance B with respect to all unevenness in the image cannot be exactly measured in some cases. In such a case, convex portions and concave portions at near side from an observer may be measured.

Also, adjacent particles forming a convex portion are needed to have the same depth from an observer. When a particle at near side from the observer is focused in measurement, a value of B may be smaller than an actual one possibly.

The ratio, B/A, is preferably 0.6 or more, more preferably 0.7 or more, and further preferably 0.8 or more. Also, from the viewpoint that a moth-eye structure may be fixed rigidly and scratch resistance is excellent, the ratio is preferably 0.9 or less.

[Plastic Substrate]

A plastic substrate of the antireflective film of the first aspect in the present invention will be explained below.

Various plastic substrate may be used, and examples thereof may include substrates containing a cellulose-based resin such as cellulose acylate (triacetate cellulose, diacetyl cellulose, acetate butyrate cellulose); a polyester resin such as polyethylene terephthalate; a (meth)acrylic resin, a polyurethane-based resin, polycarbonate, polystyrene, and olefin-based resin. From the viewpoint of easy manufacture of the infiltration layer, a substrate containing cellulose acylate, polyethylene terephthalate, or a (meth)acrylic resin is preferred, a substrate containing cellulose acylate or a (meth)acrylic resin is more preferred, and a substrate containing cellulose acylate is still more preferred. As cellulose acylate, a substrate described in Japanese Patent Laid-Open Publication No. 2012-093723 may be preferably used.

As a plastic substrate containing a (meth)acrylic resin, a thermoplastic resin including a (meth)acrylic resin in which a (meth)acrylic polymer is a main component may be used.

Here, the main component means that the (meth)acrylic polymer is contained in the substrate in an amount of 50% by mass or more.

The (meth)acrylic polymer is a concept including both a methacrylic polymer and an acrylic polymer. The (meth) acrylic polymer includes derivatives of an acrylate or a methacrylate, in particular, a (co)polymer of an acrylate ester or and a methacrylate ester. More specifically, a substrate disclosed in Japanese Patent Laid-Open Publication No. 2014-95731 may be used.

The thickness of the plastic substrate is generally 10 μm to 1000 μm, but, is preferably 20 μm to 200 μm, and more preferably 25 μm to 100 μm from the viewpoint of good process suitability, high transparency, and sufficient strength. As for the transparency of the plastic substrate, the transmittance is preferably 90% or more.

The plastic substrate may have another function layer at the surface thereof in a case where an infiltration layer may be formed when an antireflective layer is laminated on the plastic substrate. For example, a hard coat layer for imparting hard coat property to the substrate, an easily adhesive layer for imparting adhesive property to another layer, an antistatic layer for imparting antistatic property, or the like, may be provided, and a plurality of such functional layers may be provided.

[Infiltration Layer]

The antireflective film of the first aspect in the present invention may have a infiltration layer between the plastic substrate and the antireflective layer.

As for the first aspect in the present invention, the infiltration layer is a layer (region) containing a plastic substrate component or a component contained in the functional layer, and a polymer containing the (meth)acrylate compound having a molecular weight of 400 or less, and the infiltration layer may contain the viscosity increasing compound. The infiltration layer of the first aspect in the present invention may be obtained by: coating a composition for antireflective layer, containing the viscosity increasing compound, the (meth)acrylate compound having a molecular weight of 400 or less, the metallic oxide fine particles with an average primary particle diameter of 50 nm to 250 nm, and a solvent, on the plastic substrate or the functional layer formed on the plastic substrate; and infiltrating the (meth) acrylate compound having a molecular weight of 400 or less into the substrate or the functional layer provided on the plastic substrate. At this time, the viscosity increasing compound may permeate into the plastic substrate or the functional layer provided on the plastic substrate.

Here, the viscosity increasing compound means a compound capable of increasing viscosity of a solid component by addition thereof.

Hereinafter, the plastic substrate means a region containing a plastic substrate component, and not containing the viscosity increasing compound or the polymer containing the (meth)acrylate compound having a molecular weight of 400 or less. The antireflective layer also means a region different from the infiltration layer, the region containing the metallic oxide fine particles and the viscosity increasing compound.

The infiltration layer may be defined as a region in which both the plastic substrate component and the polymer of the (meth)acrylate compound having a molecular weight of 400 or less are detected by analyzing a cross section of the antireflective film of the first aspect in the present invention, obtained by cutting a microtome, with time-of-flight secondary mass spectrometer (TOF-SIMS). A thickness of the infiltration layer may be measured from TOF-SIMS.

The infiltration layer may be also measured by observing a cross section with a reflective film thickness monitor applying optical interference or a transmission electron microscope (TEM) to detect another layer between the substrate and the antireflective film. As the reflective film thickness monitor, FE-3000 manufactured by OTSUKA ELECTRONICS Co., LTD, or the like may be applicable.

A thickness of the infiltration layer is preferably 0.1 μm to 0.5 μm, from the viewpoint to form a layer having a moth-eye structure without excessively heightening a content ratio of particles in the composition for forming an antireflective layer.

The infiltration layer preferably contains a substrate permeable solvent, and more preferably contains a solvent having permeability into a substrate and not swelling the substrate, from the viewpoint to effectively form the infiltration layer. An amount of the substrate permeable solvent in the composition for forming an antireflective layer is preferably 10 to 95% by mass, and more preferably 20 to 90% by mass.

((Meth)acrylate Compound Having Molecular Weight of 400 or Less)

The infiltration layer of the antireflective film of the first aspect in the present invention may contain the polymer obtained by polymerizing the (meth)acrylate compound having a molecular weight of 400 or less.

The (meth)acrylate compound having a molecular weight of 400 or less has a function that before coating, a content ratio of particles becomes low and a content ratio of the binder resin and the binder resin forming compound becomes high to prevent the particles from aggregation, and after coating, by infiltration into the substrate to form the infiltration layer, the particles are relatively protruded. The (meth)acrylate compound having a molecular weight of 400 or less is not limited so long as a molecular weight is 400 or less and a (meth)acryloyl group is contained. However, from the viewpoint to improve film strength after polymerization-curing, it is preferable that two or more (meth)acryloyl groups are contained in one molecular. Further, since it forms the infiltration layer after infiltration into the substrate by polymerization-curing, it is preferable that the (meth) acrylate compound having a molecular weight of 400 or less has a good compatibility with a material of the substrate, from the viewpoint of light transmittance and light scattering.

Examples of the (meth)acrylate having a molecular weight of 400 or less include, 2-hydroxyethyl methacrylate (HEMA), 1,4-butanediol acrylate, pentaerythritol triacrylate, pentaerythritol tetraacrylate, trimethylol propane triacrylate, glycidyl(meth)acrylate, alkylene oxide modified acrylate. Also, examples of commercially available products thereof include Viscoat#195, Viscoat#295, manufactured by OSAKA ORGANIC CHEMICAL INDUSTRY LTD., BLEMMER G, BLEMMER GMR, BLEMMER PDE-200, manufactured by NOF CORPORATION, KAYARAD PET30 manufactured by Nippon Kasei Chemical Co., Ltd., NK ESTER A-TMPT manufactured by Shin-Nakamura Chemical Co., Ltd.

A molecular weight of the (meth)acrylate compound having a molecular weight of 400 or less is preferably 150 to 400, and more preferably 200 to 350. In the case of the lower limit or more, it is possible to prevent contamination of manufacturing apparatuses by volatilization in manufacturing process, and in the case of the upper limit or less, infiltration into the substrate or the functional layer is facilitated to be occurred.

[Antireflective Layer]

The antireflective layer of the first aspect in the present invention contains the metallic oxide fine particles having an average primary particle diameter of 50 nm to 250 nm and the viscosity increasing compound.

The antireflective layer has a moth-eye structure by the metallic oxide fine particles at the surface opposite to the interface with the infiltration layer. The antireflective layer of the first aspect in the present invention is formed on the infiltration layer, for example, by coating the composition for forming an antireflective film on the plastic substrate, and infiltrating the (meth)acrylate compound having a molecular weight of 400 or less into the plastic substrate so as to form the infiltration layer. The antireflective layer may further contain a binder resin, and also the viscosity increasing compound may function as a binder resin as well.

A thickness of the antireflective layer is preferably 0.05 μm to 5 μm, and more preferably 0.1 μm to 1 μm.

(Metallic Oxide Fine Particle)

The metallic oxide fine particles forming a moth-eye structure in the antireflective layer will be explained below. The metallic oxide fine particles have an average primary particle diameter of 50 nm to 250 nm.

The metallic oxide fine particles preferably have dispersibility, Cv value, of the average primary particle diameter of 10% or less. The dispersibility, Cv value, whose unit is % may be obtained by the following formula (1).

$$Cv \text{ value} = ([\text{standard deviation of average primary particle diameter}]/[\text{average diameter}]) * 100 \quad \text{formula (1)}$$

As Cv value is small, distribution of the average primary diameter is small. The average primary particle diameter is measured by using a scanning electron microscope (SEM). The average particle diameter and the standard deviation thereof of the metallic oxide fine particles are calculated based on measured values of diameter of 200 or more metallic oxide fine particles. Here, the average particle diameter means the maximum diameter of a circumscribed circle in the case where a particle is not in a spherical shape. When a plurality of kinds of particles having different average primary particle diameter is mixed, Cv value in the whole particles is calculated.

In the case where the average primary particle diameter is 50 nm or more, the antireflective layer having a moth-eye structure can be formed, and in the case where the average primary particle diameter is 250 nm or less, Bragg diffraction occurred by arranging the metallic oxide fine particles regularly is difficult to be occurred at visible light region, and coloring phenomenon derived therefrom is prevented. A small Cv value is preferred because aggregation of particles is not likely to be occurred and an antireflective layer having a high transmittance and a moth-eye structure may be formed without coloring phenomenon. The average primary is preferably 100 nm to 220 nm, and more preferably 120 nm to 200 nm. Cv value is preferably 1 to 10%, and more preferably 1 to 5%. For reason that Cv value can be small, the metallic oxide fine particles preferably contain the metallic oxide fine particles having the average primary particle diameter of 50 nm to 250 nm only, more preferably contain the metallic oxide fine particles having the average primary particle diameter of 100 nm to 220 nm only, further preferably contain the metallic oxide fine particles having the average primary particle diameter of 120 nm to 200 nm only.

The average primary particle diameter of the metallic oxide fine particles indicates a 50% accumulative particle diameter of a volume average particle diameter. When the average primary particle diameter of the metallic oxide fine particles contained in the antireflective layer is measured, the measurement may be performed by an electron microscope. For example, the antireflective layer is observed from the surface side with a SEM image at a suitable magnification (around magnification of 5,000) to measure diameters of 100 primary particles, and the volume is calculated to obtain a 50% accumulative particle diameter as the average primary particle diameter. When a particle does not have a spherical diameter, an average of the major diameter and the minor diameter thereof is considered as a diameter of the primary particle. At this time, in order to facilitate the observation, a sample may be suitably subjected to carbon vapor deposition, etching treatment, or the like.

For the first aspect in the present invention, indentation hardness of the metallic oxide fine particles is preferably 400 MPa or more, more preferably 450 MPa or more, and most preferably 550 MPa or more. When the indentation hardness of the metallic oxide fine particles is 400 MPa or more, it is preferable that durability to a pressure in a thickness direction of a moth-eye structure is high. Also, it is preferable that the indentation hardness of the metallic oxide fine particles is 1,000 MPa or less so as to prevent the metallic oxide fine particles from being brittle or being cracked.

The indentation hardness of the metallic oxide fine particles may be measured with a nanointender or the like. Specifically, the indentation hardness may be measured in a manner where the metallic oxide fine particles are arranged on a substrate (glass plate, quartz plate or the like) being harder than the metallic oxide fine particles so as not to be stacked two or more high, and a diamond indenter is indented. At this time, it is preferable that the metallic oxide fine particles are fixed with a resin or the like not to move them. However, when the metallic oxide fine particles are fixed with a resin, a part of the metallic oxide fine particles is exposed. Also, it is preferable that indentation point is determined with a tribo indenter.

In the present application, the indentation hardness of the metallic oxide fine particles is measured in a manner where particles are arranged on a substrate, the particles is fixed by using a small amount of a curable resin so as not to affect the measured value, the obtained sample is measured with an indenter.

Examples of the metallic oxide fine particles include silica particles, titania particles, zirconia particles, antimony pentoxide particles, and the like. Among them, silica particles are preferable because the silica particle has a close refractive index to various binders so that haze hardly occurs and a moth-eye structure is easily formed.

As the metallic oxide fine particles, pyrogenic silica particles are particularly preferable for the reason that a hydroxyl group is contained at the surface thereof in an appropriate amount, and the particles are hard.

The pyrogenic silica particles may be prepared by subjecting a hydrolysable silicon compound to hydrolysis and condensation in an organic solvent containing water and a catalyst to obtain silica particle, and by calcining the silica particles. For example, Japanese Patent Laid-Open Publication Nos. 2003-176121, 2008-137854, and the like, may be referred.

The silicon compound as a material for preparing the pyrogenic silica particles is not particularly limited, but examples thereof may include a chlorosilane compound such as tetrachlorosilane, methyltrichlorosilane, phenyltrichlorosilane, dimethyldichlorosilane, diphenyldichlorosilane, methylvinyldichlorosilane, trimethylchlorosilane, and methyldiphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino)propyltrimethoxysilane, phenyltrimethoxysilane, phenyltriethoxysilane, dimethyldimethoxysilane, dimethyldiethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyltriacetoxysilane, phenyltriacetoxysilane, dimethyldiacetoxysilane, diphenyldiacetoxysilane, and trimethylacetoxysilane; and a silanol compound such as dimethylsilanediol, diphenylsilanediol, trimethylsilanol. Among the silane compounds as exemplified above, the alkoxysilane compound is particularly preferred in that it is more easily available and no halogen atom is contained as an impurity in the resultant pyrogenic silica particles. As a preferred form of the pyrogenic silica particles according to the present invention, it is preferred that the content of halogen atoms is substantially 0%, that is, no halogen atom is detected.

The calcination temperature is not particularly limited, but preferably 800° C. to 1,300° C., and more preferably 1,000° C. to 1,200° C.

As the pyrogenic silica particles, pyrogenic silica particles surface-modified with a compound having a (meth)acryloyl group are preferable. By using the pyrogenic silica particles surface-modified with a compound having a (meth)acryloyl group, it is expected to improve dispersibility in the composition for forming an antireflective layer, film strength, and the like, and to prevent aggregation, and the like. Specific methods for surface treatment and preferable embodiments thereof may be referred from the disclosure of [0119] to [0147] of Japanese Patent Laid-Open Publication No. 2007-298974.

The shape of the metal oxide fine particles are most preferably spherical, but may be amorphous other than spherical.

The metal oxide particles may be prepared by calcining commercially available particles. Specific examples thereof may include IPA-SL-L (average primary particle diameter: 50 nm, silica sol, manufactured by NISSAN CHEMICAL INDUSTRIES, LTD.), IPA-ST-ZL (average primary particle diameter: 80 nm, silica sol, manufactured by NISSAN CHEMICAL INDUSTRIES, LTD.), Snowtex MP-1040 (average primary particle diameter: 100 nm, silica manufactured by NISSAN CHEMICAL INDUSTRIES, LTD.), Snowtex MP-2040 (average primary particle diameter: 200 nm, silica manufactured by NISSAN CHEMICAL INDUSTRIES, LTD.), SEAHOSTAR KE-P10 (average primary particle diameter: 150 nm, amorphous silica manufactured by Nippon Shokubai Co., Ltd.), SEAHOSTAR KE-P20 (average primary particle diameter: 200 nm, amorphous silica manufactured by Nippon Shokubai Co., Ltd.), and ASFP-20 (average primary particle diameter: 200 nm, alumina manufactured by Denki Kagaku Kogyo K.K.). Further, as long as the requirements of the first aspect in the present invention are satisfied, commercially available particles may be used as they are.

A distribution of the distance A between apexes of the adjacent convex portions in the antireflective film preferably has a half width of 200 nm or less. The state where the half width is 200 nm or less means that the distribution of the distance A is sharp and particles are uniformly dispersed. Such a state is preferable from the viewpoint of lowering haze and reflectance. The half width of the distribution of the distance A is more preferably 125 nm or less, and further preferably 100 nm or less.

A content of the metallic oxide fine particles in the antireflective layer is preferably 50 to 95% by mass, and more preferably 50 to 90% by mass, with respect to the total amount of the antireflective layer. In the case where the content of the metallic oxide fine particles is 50% by mass or more, a moth-eye structure tends to be formed, depending on the diameter. In the case where the content of the metallic oxide fine particles is 95% by mass or less, the particles can adhere as the antireflective layer.

(Viscosity Increasing Compound)

The antireflective layer of the first aspect of the present invention contains the viscosity increasing compound in order to prevent the metallic oxide fine particles from being aggregated. Here, the viscosity increasing compound means a compound capable of increasing viscosity of a solid component due to addition thereof and has a higher viscosity than one of the (meth)acrylate compound having a molecular weight of 400 or less. The viscosity increasing compound is not particularly limited as long as the viscosity increasing compound is soluble into the composition for forming an antireflective layer, and is appropriately selected in view of compatibility with the metallic oxide fine particles and the (meth)acrylate compound having a molecular weight of 400 or less. Examples of the viscosity increasing compound include an organic polymer thickener, an inorganic oxide thickener, and the like. Among them, a urethane compound is preferable from the viewpoint of high effect for preventing aggregation of the particles and good compatibility with the metallic oxide fine particles or the (meth)acrylate compound having a molecular weight of 400 or less, and a urethane (meth)acrylate having 4 or more functional group is more preferable from the view point of excellent scratch resistance. The viscosity increasing compound may also function as a binder. In this case, an organic acrylic low molecular compound or the like may be preferably used as the viscosity increasing compound.

The viscosity increasing compound preferably has a viscosity of 15 to 100,000 mPa·s at 100° C., and more preferably has a viscosity of 30 to 10,000 mPa·s at 100° C. By satisfying the above range, in a heating and drying process where the (meth)acrylate compound having a molecular weight of 400 or less permeates into the substrate, an effect for preventing the particles from being aggregated may be developed.

<Organic Polymer Thickener>

Examples of the organic polymer thickener are exemplified below, but the organic polymer thickener is not limited thereto.

The examples include poly-ε-caprolactone, poly-ε-caprolactone diol, poly-ε-caprolactone triol, polyvinyl acetate, poly(ethylene adipate), poly(1,4-butylene adipate), poly(1,4-butylene glutarate), poly(1,4-butylene sccinate), poly(1,4-butylene terephthalate), poly(ethylene terephthalate), poly(2-methyl-1,3-propylene adipate), poly(2-methyl-1,3-propylene glutarate), poly(neopentyl glycol adipate), poly(neopentyl glycol sebacate), poly(1,3-propylene adipate), poly(1,3-propylene glutarate), polyvinyl butyral, polyvinyl formal, polyvinyl acetal, polyvinyl propanal, polyvinyl hexanal, polyvinyl pyrrolidone, polyester acrylate, polyester methacrylate, cellulose acetate, cellulose propionate, cellulose acetate butyrate, polystyrene, polyurethane, and the like.

As a molecular weight of the viscosity increasing compound, a number average molecular weight is preferably 3,000 to 400,000, more preferably 4,000 to 300,000, and particularly preferably 5,000 to 200,000.

When the viscosity increasing compound is a polymer of a monomer having a polymerizable group, a calculation value of molecular weight of cross linking point of the viscosity increasing compound is preferably 500 or more, more preferably 550 or more, and further preferably 700 or more. As the molecular weight of cross linking point is large, thickening effect becomes high. The calculation value of molecular weight of cross linking point means the total atomic weight of atomic groups sandwiched by (a) and (a), (b) and (b), and (a) and (b), wherein (a) is a carbon atom substituted with 3 or more carbon atoms or silicon atoms, and (b) is a silicon atom substituted with 3 or more carbon atoms or silicon atoms, in a polymer formed by polymerizing all of polymerizable groups in a monomer. However, a compound containing a fluorine atom or a silicon atom has a lower refractive index than a compound having no fluorine atom or silicon atom, and if the compound containing a fluorine atom or a silicon atom is used as a binder resin of the antireflective film, reflectance tends to be impaired, depending on the substrate. Therefore, the compound containing no carbon atom or silicon atom is preferred.

<Inorganic Oxide Thickener>

Examples of the inorganic oxide thickener include the following compound, but the inorganic oxide thickener is not limited thereto.

The examples include known viscosity modifier or a thixotropy-imparting agent such as a smectite, a fluorine four silicon mica, a bentonite, a silica, a montmorillonite, and a sodium polyacrylate disclosed in Japanese Patent Laid-Open Publication No. 1108-325491, ethyl cellulose, polyacrylate, and an organic clay disclosed in Japanese Patent Laid-Open Publication No. H10-219136, and the like.

The viscosity increasing compound may function as a binder resin as well. In this case, the viscosity increasing compound is preferably an organic acrylic low molecular compound, and it is preferable that viscosity thereof is high. Since it is preferable that a refractive index is gradually varied in a region other than one having a moth-eye structure, the viscosity increasing compound may permeate into the substrate. When the viscosity increasing compound is present in the infiltration layer, since it is preferable that the viscosity increasing compound effectively functions for preventing the particles in the antireflective layer from being aggregated, a concentration of the viscosity increasing compound in the infiltration layer is preferably lower than one in the antireflective layer.

The content of the viscosity increasing compound in the antireflective layer is preferably 1 to 50% by mass, and more preferably 5 to 40% by mass. In the case where the content is 1% by mass or more, an effect for preventing the particles from being aggregated is easily showed. In the case where the content is 50% by mass or less, a moth-eye structure is easily formed, depending on diameter of the particles.

<Binder Resin>

As previously described, the antireflective layer may further contain a binder resin.

The binder resin is preferably formed by cross linking reaction or polymerization reaction of a curable compound, which is a compound having a polymerizable group. The curable compound is preferably an ionizing-radiation-curable compound. Examples of the curable compound include an ionizing-radiation-curable polyfunctional monomer and polyfunctional oligomer.

As a functional group of the ionizing-radiation-curable polyfunctional monomer and the polyfunctional oligomer, a photo-polymerizable functional group, an electron-beam-polymerizable functional group, and a radiation-polymerizable functional group are preferable. Among them, a photo-polymerizable functional group is preferable.

Examples of the photopolymerizable functional group include unsaturated polymerizable functional groups such as a (meth)acryloyl group, a vinyl group, a styryl group, and an allyl group, and among them, a (meth)acryloyl group is preferred.

Specific examples of the compound having a polymerizable unsaturated group include:

(meth)acrylic acid diesters of alkylene glycol, such as neopentyl glycol acrylate, 1,6-hexanediol (meth)acrylate and propylene glycol di(meth)acrylate; (meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate; (meth)acrylic acid diesters of polyhydric alcohol, such as pentaerythritol di(meth)acrylate; (meth)acrylic acid diesters of ethylene oxide or propylene oxide adduct, such as 2,2-bis{4-(acryloxy.diethoxy) phenyl}propane and 2-2-bis{4-(acryloxy polypropoxy) phenyl}propane; and the like.

Epoxy(meth)acrylates, urethane(meth)acrylates and polyester(meth)acrylates may also be preferably used as a photopolymerizable polyfunctional monomer.

Among those described above, esters of a polyhydric alcohol and (meth)acrylic acid are preferred, and polyfunctional monomers having three or more (meth)acryloyl groups in one molecule thereof are more preferred.

Specific examples thereof include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, caprolactone-modified tris(acryloxyethyl)isocyanurate and the like.

Specific examples of the polyfunctional acrylate-based compound having a (meth)acryloyl group may include an esterified product of polyol and (meth)acrylate such as KAYARAD DPHA, DPHA-2C, PET-30, TMPTA, TPA-320, TPA-330, RP-1040, T-1420, D-310, DPCA-20, DPCA-30, DPCA-60, GPO-303 manufactured by Nippon Kayaku Co., Ltd., and V#3PA, V#400, V#36095D, V#1000, V#1080 manufactured by OSAKA ORGANIC CHEMICAL INDUSTRY LTD. Further, 3 or more functional urethane acrylate compounds such as SHIKOH UV-1400B, UV-1700B, UV-6300B, UV-7550B, UV-7600B, UV-7605B, UV-7610B, UV-7620EA, UV-7630B, UV-7640B, UV-6630B, UV-7000B, UV-7510B, UV-7461TE, UV-3000B, UV-3200B, UV-3210EA, UV-3310EA, UV-3310B, UV-3500BA, UV-3520TL, UV-3700B, UV-6100B, UV-6640B, UV-2000B, UV-2010B, UV-2250EA, and UV-2750B (manufactured by Nippon Synthetic Chemical Industry Co., Ltd.), UL-503LN (manufactured by KYOEISHA CHEMICAL Co., Ltd.), UNIDIC 17-806, 17-813, V-4030, and V-4000BA (manufactured by DIC Corporation), EB-1290K, EB-220, EB-5129, EB-1830, and EB-4858 (manufactured by Daicel-UCB Co. Ltd.), HI-COAP AU-2010, and AU-2020 (manufactured by TOKU- SHIKI Co., Ltd.), ARONIX M-1960 (manufactured by TOAGOSEI CO., LTD.), ART RESIN UN-3320HA, UN-3320HC, UN-3320HS, and UN-904, HDP-4T, and tri- or higher polyfunctional polyester compounds such as ARONIX M-8100, M-8030, and M-9050 (manufactured by TOAGOSEI CO., LTD.), and KRM-8307 (manufactured by DAICEL-CYTEC Company Ltd.), may be suitably used. Particularly, DPHA or PET-30 is preferably used.

Further, examples thereof may also include a resin having three or more (meth)acryloyl groups, for example, a relatively low molecular weight polyester resin, polyether resin, acrylic resin, epoxy resin, urethane resin, alkyd resin, spiroacetal resin, polybutadiene resin, polythiolpolyene resin, and a oligomer or prepolymer of a polyfunctional compound such as polyhydric alcohol.

Further, a dendrimer described in Japanese Patent Laid-Open Publication Nos. 2005-76005 and 2005-36105, or a nobornene ring-containing monomer described in Japanese Patent Laid-Open Publication No. 2005-60425, may be used.

A silane coupling agent having a polymerizable group may be used because of excellent bonding property with the metallic oxide fine particles, and a silane compound having a (meth)acryloxy group is preferable. Examples thereof include 3-(meth)acryloxypropyltrimethoxysilane, 3-(meth) acryloxypropylmethyldimethoxysilane, 3-(meth)acryloxypropyldimethylmethoxysilane, 3-(meth)acryloxypropylmethyldiethoxysilane, 3-(meth)acryloxypropyltriethoxysilane, 2-(meth)acryloxyethyltrimethoxysilane, 2-(meth)acryloxyethyltriethoxysilane, 4-(meth)acryloxybutyltrimethoxysilane, 4-(meth)acryloxybutyltriethoxysilane, and the like. Specifically, KBM-503, KBM-5103, X-40, manufactured by Shin-Etsu Chemical Co., Ltd., silane coupling agents X-12-1048, X-12-1048, X-12-1050, manufactured by Shin-Etsu Chemical Co., Ltd., disclosed in Japanese Patent Laid-Open Publication No. 2014-123091, or the like, may be used.

The polyfunctional monomer may be used in combination of two or more kinds thereof. Polymerization of the monomer having an ethylenically unsaturated group may be performed by irradiation with ionizing radiation or heating in the presence of a photo-radical initiator or a thermal-radical initiator.

<Dispersant>

The antireflective layer of the first aspect in the present invention may include a dispersant from the viewpoint of preventing the particles from being aggregated. The dispersant is not particularly limited, but is preferably an anionic compound such as sulfate and phosphate, a cationic compound such as an aliphatic amine salt and a quaternary ammonium salt, a nonionic compound, or a polymer compound, and more preferably a polymer compound because of high degree of freedom of selection for each of adsorptive groups and repulsive groups. The dispersant may be commercially available. Examples thereof may include DISPERBYK 160, DISPERBYK 161, DISPERBYK 162, DISPERBYK 163, DISPERBYK 164, DISPERBYK 166, DISPERBYK 167, DISPERBYK 171, DISPERBYK 180, DISPERBYK 182, DISPERBYK 2000, DISPERBYK 2001, DISPERBYK 2164, Bykumen, BYK-P104, BYK-P104S, BYK-220S, Anti-Terra203, Anti-Terra204, and Anti-Terra205 (all trade names), manufactured by BYK-Chemie Japan K. K.

When the antireflective layer contains a dispersant, the content of the dispersant is preferably 0.01% by mass to 20% by mass, more preferably 0.05% by mass to 10% by mass, and still more preferably 0.1% by mass to 5% by mass based on the particle amount.

<Leveling Agent>

The antireflective layer of the first aspect in the present invention may contains a leveling agent (also called an antifouling agent).

Specific examples of the leveling agent may include conventionally known leveling agents such as fluorine-based or silicone-based leveling agents. The composition for forming an antireflective layer to which a leveling agent is added may impart a coating stability, slipperiness, antifouling property, and scratch resistance to the surface of the coating film during coating or drying.

The antireflective film of the first aspect in the present invention preferably has an integral reflectance of 3% or less in a wavelength region of 380 nm to 780 nm, and an integral reflectance of 2% or less is more preferable.

The antireflective film of the first aspect in the present invention preferably has a haze value of 5% or less, and a haze value of 3% or less is more preferable.

[Hard Coat Layer]

Figure 3:
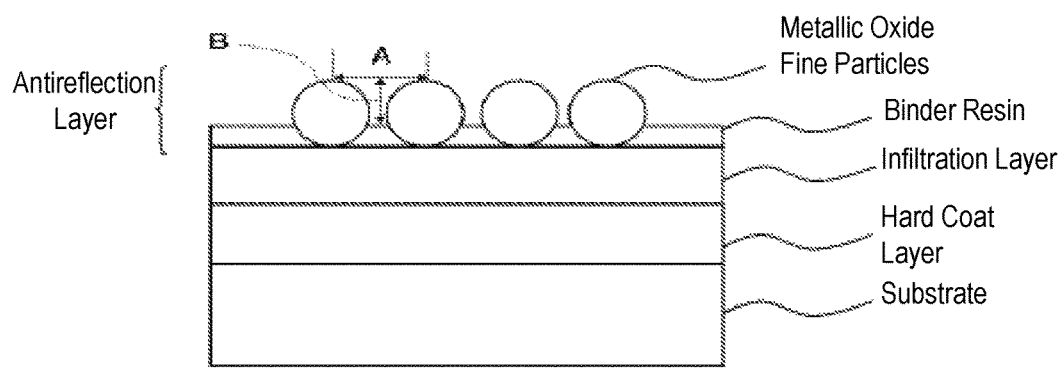
FIG. 3 is a schematic view illustrating an exemplary antireflective film of a first aspect with a hard coat layer in the present invention.

The antireflective film of the first aspect in the present invention may have a hard coat layer between the plastic substrate and the infiltration layer (please see FIG. 3).

The hard coat layer may be formed from the same material as the binder resin of the antireflective layer.

In order to form the infiltration layer when the antireflective layer is laminated on the hard coat layer, the following method or the like is preferable. When coating the composition for forming an antireflective layer, the hard coat layer is previously in a half cured state so as to permeate the (meth)acrylate compound having a molecular weight of 400 or less contained in the composition for forming an antireflective layer therein, and the hard coat layer is fully-cured after forming the infiltration layer. In the case where the hard coat layer is formed in the above manner, both of antireflective property and hard coat property may be imparted.

A thickness of the hard coat layer is generally around 0.5 µm to 50 µm, and preferably 1 µm to 20 µm from the viewpoint of imparting sufficient durability and impact resistance.

Strength of the hard coat layer is preferably H or more, more preferably 2H or more, and most preferably 3H or more. Further, in the taber test in accordance with JIS K 5400, small abrasion amount after the test is preferable.

<Other Component>

In addition to the above-described components, a solvent, a polymerization initiator, an antistatic agent, and an anti-glare agent may be further added appropriately to a composition for forming a hard coat layer. Further, various additives such as a reactive or unreactive leveling agent and various sensitizers may be mixed therein.

<Solvent of Composition for Forming Hard Coat Layer>

Examples of a solvent of the composition for forming a hard coat layer include isopropanol (IPA), methyl ethyl ketone (MEK), methyl isobutyl ketone (MIBK), toluene, and the like.

<Polymerization Initiator>

Radical and cationic polymerization agents may be appropriately selected and used as necessary. These polymerization initiators are decomposed by light irradiation and/or heating to generate radical or cation, which progress polymerization.

<Antistatic Agent>

Specific examples of the antistatic agent may include a conventionally known antistatic agent such as a quaternary ammonium salt, a conductive polymer, and conductive particles, within a range where the infiltration layer can be formed when laminating the antireflective layer.

<Antiglare Agent>

As an antiglare agent, a know antiglare agent such as a fine particle antiglare agent like styrene beads (refractive index: 1.59), methyl polymethacrylate beads (refractive index: 1.49), copolymer of methyl methacrylate and styrene, or the like, may be used within the range where the infiltration layer can be formed when laminating the antireflective layer. In the case where the fine particle antiglare agent is used, an addition amount thereof is preferably 2 to 30 parts by mass, and more preferably 10 to 25 parts by mass, with respect to 100 parts by mass of the composition for forming a hard coat layer.

<Refractive Index Adjusting Agent>

In order to control the refractive index of the hard coat layer, a high-refractive index monomer or inorganic particles may be added as a refractive index adjusting agent, within the range where the infiltration layer can be formed when laminating the antireflective layer. In addition to the effect of controlling the refractive index, the inorganic particles have an effect of suppressing curing shrinkage by a crosslinking reaction. In the first aspect of the present invention, a polymer, including inorganic particles dispersed therein, formed by polymerization of the polyfunctional monomer and/or the high-refractive index monomer after the formation of the hard coat layer, is referred to as a binder.

<Leveling Agent>

A leveling agent same as one in the antireflective film may be used. The hard coat layer which is added with the leveling agent may impart a coating stability to the surface of the coating film during coating or drying and may form a uniform infiltration layer when laminating the antireflective film. In order to improve scratch resistance, a compound which hardly remains at the surface of the hard coat layer due to migration to the upper layer is preferable. Specifically, the compounds disclosed in Japanese Patent No. 4,474,114 or the like may be preferably used.

An antireflective film of a second aspect of the present invention will be explained below.

[Antireflective Film]

The antireflective film of the second aspect of the present invention include, in this order, a substrate, a hard coat layer, and antireflective layer containing metallic oxide fine particles with an average primary particle diameter of 50 nm to 380 nm and a binder resin. The hard coat layer and the antireflective layer are in contact with each other, and the antireflective film has a moth-eye structure constituted by an uneven shape formed by the metallic oxide fine particles. The surface of the antireflective film has a particle occupancy ratio of 40% to 90%, the uneven shape satisfies the following formulae (2) and (3), wherein K represents an average value of a distance B between the middle of apexes of adjacent convex portions and a concave portion, σ represents a standard deviation of a distribution of the distance B, and R represents an average primary particle diameter of the metallic oxide fine particles.

$R/2 \leq K \leq 9R/10$      Formula (2)

$\sigma \leq 40$      Formula (3)

Figure 2:
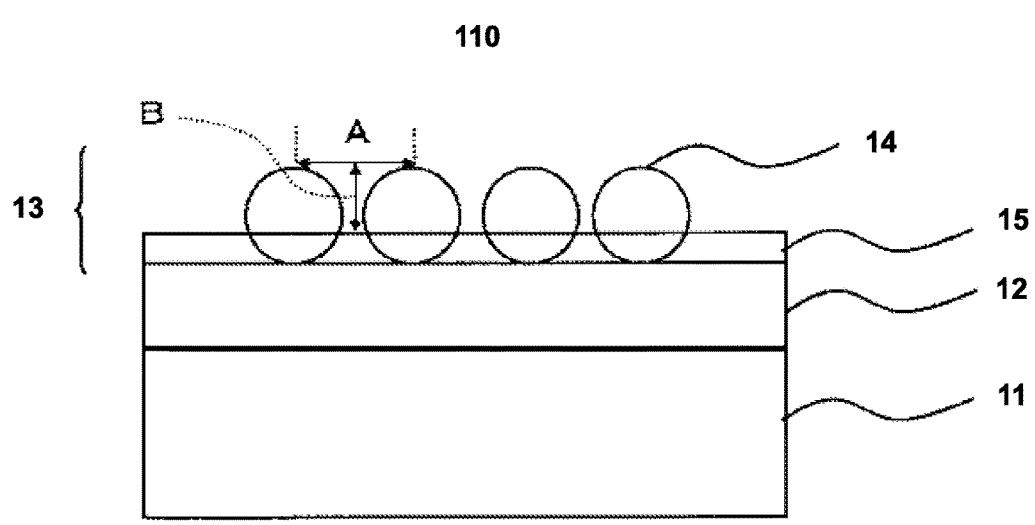
FIG. 2 is a schematic view illustrating an exemplary antireflective film of a second aspect in the present invention.

FIG. 2 shows a preferable embodiment of the antireflective film of the second aspect in the present invention.

The antireflective film 110 of FIG. 2 includes the substrate 11, a hard coat layer 12 formed on the substrate 11, and the antireflective layer 13 on the hard coat layer 12. The antireflective layer 13 has a moth-eye structure constituted by an uneven shape formed by the metallic oxide fine particles 14 at a surface opposite to the interface with the hard coat layer 12.

The antireflective layer 13 contains the metallic oxide fine particles 14 and a binder resin 15.

(Moth-Eye Structure)

The antireflective layer of the second aspect in the present invention also has a moth-eye structure constituted by an uneven shape formed by the metallic oxide fine particles.

In the moth-eye structure of the second aspect in the present invention, the particle occupancy at the surface of the antireflective layer is 40% to 90%. Here, a measuring method of the particle occupancy is the same as explained in the first aspect of the present invention.

In order to appropriately adjust a distance between adjacent particles and a distance between a concave portion and the middle of apexes of adjacent convex portions to reduce reflectance, it is preferable that the metallic oxide fine particles are arranged in a high filling ratio. Also, it is important that the filling ratio is not too high. When the particle occupancy is 40% or more, a distance between adjacent convex portions is not too large, and a fine moth-eye structure patter may be formed. Also, when the particle occupancy is 90% or less, adjacent particles are arranged without being in contact with each other so that the distance B, may be adjusted in a desired range. From the above viewpoint, a content of the metallic oxide fine particles forming a convex portion is preferably adjusted so as to be uniform in the whole antireflective layer. The particle occupancy is preferably 50% to 80%.

The uneven shape of the antireflective layer in the antireflective film of the second aspect in the present invention satisfies the following formulae (2) and (3), wherein K represents an average value of a distance B, σ represents a standard deviation of a distribution of the distance B, and R represents an average primary particle diameter of the metallic oxide fine particles.

$R/2 \leq K \leq 9R/10$      Formula (2)

$\sigma \leq 40$      Formula (3)

The formula (2) means that the average K of the distance B is one seconds of the average primary particle diameter R of the metallic oxide fine particles to nine tenths thereof. When the average value K of the distance B falls within the above range, the distance between the concave portion and the middle of apexes of adjacent convex portions is sufficient, and a refractive index gradient layer whose refractive index is varied more gradually from the air towards the inside of the antireflective layer is artificially produced, so that reflectance may be reduced. The average value K of the distance B is preferably 5R/9 to 5R/6, and more preferably 2R/3 to 3R/4.

Also, the formula (3) means that the distribution of the distance B is not too large. When the standard deviation σ is 40 or less and the average value K is within the above range, the distance between the concave portion and the middle of apexes of adjacent convex portions is sufficient in any region of the antireflective layer, and excellent antireflective property may be obtained. From the above viewpoint, the standard deviation σ is preferably 35 or less, and more preferably 30 or less.

With respect to the moth-eye structure, the measuring methods of the distance A between the apexes of adjacent convex portions and the distance B between the middle of apexes of adjacent convex portions and a concave portion are the same those as explained in the first aspect of the present invention.

In order for the uneven shape of the antireflective layer to satisfy the formulae (2) and (3), the present inventors have found that a method for using a binder resin forming compound that has poor wettability with respect to the metallic oxide fine particles and good wattability with respect to the hard coat layer is effective, and by this, a height of the binder resin becomes uniform and reflectance may be reduced even when the antireflective layer is formed on the hard coat layer.

The metallic oxide fine particles and the hard coat layer used in the second aspect in the present invention preferably satisfy the following formulae (4) and (5). When they are dispersed in 11 kinds of ethanol/acetone mixed solvent varying a mass ratio of ethanol to the whole solvent from 0 to 1 by 0.1, M represents a mass ratio of ethanol to the whole mixed solvent in a mixed solvent in which precipitation of the metallic oxide fine particles is the slowest, and L represents a contact angle of water with respect to the hard coat layer.

$$-120M+130 \geq L \quad \text{Formula (4)}$$

$$L \leq 50° \quad \text{Formula (5)}$$

A calculation method of M will be more specifically explained below.

11 kinds of mixed solvent are prepared so that each (a mass ratio of ethanol/acetone) is (0/1.0), (0.1/0.9), (0.2/0.8), (0.3/0.7), (0.4/0.6), (0.5/0.5), (0.6/0.4), (0.7/0.3), (0.8/0.2), (0.9/0.1), and (1.0/0). 0.7 g of the metallic oxide fine particles are dispersed into 6.3 g of the mixed solvent by an ultrasonic dispersion for 10 minutes to prepare 11 kinds of dispersion. Then, each dispersion leaves at rest, and the dispersion precipitation of the metallic oxide fine particles is the slowest is observed, and M is determined as a mass ratio of ethanol to the whole mixed solvent.

As for formula (4), when the metallic oxide fine particles are dispersed into the mixed solvent of ethanol and acetone, as an acetone ratio is high, wettability of the binder with respect to the particles becomes poor. Also, when satisfying the both formulae (4) and (5), wettability of the binder with respect to the hard coat layer becomes good and a moth-eye structure is easily formed. However, when both formulae (4) and (5) are not satisfied, wettability of the binder with respect to the particles becomes good and a moth-eye structure is difficult to be formed.

From the above viewpoint, a relationship between the mass ratio M of ethanol to the whole mixed solvent and the contact angle L is preferably $-120M+130 \geq L$, more preferably $-120M+110 \geq L$, and further preferably $-120M+90 \geq L$ (Metallic Oxide Fine Particle)

The metallic oxide fine particles forming a moth-eye structure of the antireflective layer of the second aspect in the present invention will be explained below.

The metallic oxide fine particles have an average primary particle diameter of 50 nm to 380 nm. The average primary particle diameter is preferably 100 nm to 320 nm, and more preferably 120 nm to 250 nm. When the average primary particle diameter is 50 nm or more, aggregation of the particle may be prevented. When the average primary particle diameter is 380 nm or less, a haze may be prevented.

The average primary particle diameter means a 50% accumulative particle diameter of a volume average particle diameter. When the average primary particle diameter of the metallic oxide fine particles contained in the antireflective layer is measured, the measurement may be performed by an electron microscope. For example, observation of a TEM image of a cross section of the antireflective layer is performed to measure diameters of 100 primary particles, and the volume is calculated to obtain a 50% accumulative particle diameter as the average primary particle diameter. When a particle does not have a spherical diameter, an average of the major diameter and the minor diameter thereof is considered as a diameter of the primary particle.

From the viewpoint that affinity of the binder with respect to the metallic oxide fine particles becomes poor, metallic oxide fine particles surface-modified with a compound containing at least one of an alkyl group, a (meth)acryloyl group, an organosiloxane and a fluorine atom is preferable. Meanwhile, a (meth)acryloyl group is a concept including both a methacryloyl group and an acryloyl group.

The compound containing a (meth)acryloyl group is preferably a silane coupling agent having a (meth)acryloyl group. Also, a surface treatment is preferably a silane coupling treatment.

Use of the metallic oxide fine particles surface-modified with the compound containing a (meth)acryloyl group is preferable because cross linking reaction with a substituent in a suitable compound for a component of a binder resin, described later, occurs, the metallic oxide fine particles is rigidly fixed with the binder resin, hardness of a moth-eye structure is high, and the metallic oxide fine particles becomes difficult to be detached.

Use of the metallic oxide fine particles surface-modified with the compound containing an organosiloxane is preferable because abrasion force of the antireflective film is reduced and scratch resistance becomes high.

Use of the metallic oxide fine particles surface-modified with the compound containing a fluorine atom is preferable because antifouling property may be imparted into the whole surface of the particles, and antifouling property of the antireflective layer is improved.

Specific methods of surface treatment and preferable embodiments thereof may be referred from the disclosure of [0119] to [0147] of Japanese Patent Laid-Open Publication No. 2007-298974.

Examples of the metallic oxide fine particles include silica particles, titania particles, zirconia particles, antimony pentoxide particles, and the like. Among them, silica particles are preferable because the silica particle has a close refractive index to various binders so that haze hardly occurs and a moth-eye structure is easily formed.

As the metallic oxide fine particles, pyrogenic silica particles are particularly preferable.

The pyrogenic silica particles may be prepared by subjecting a hydrolysable silicon compound to hydrolysis and condensation in an organic solvent containing water and a catalyst to obtain silica particle, and by calcining the silica particles. For example, Japanese Patent Laid-Open Publication Nos. 2003-176121, 2008-137854, and the like, may be referred.

A silicon compound as a raw material for preparing the pyrogenic silica particles and a temperature during calcination are the same as explained in the first aspect of the present invention.

The silica particles may be crystalline or amorphous.

A shape of the metallic oxide fine particles and commercially available products thereof are the same as explained in the first aspect of the present invention.

A content of the metallic oxide fine particles is preferably 10% by mass to 95% by mass, more preferably 35% by mass to 90% by mass, and further preferably 65% by mass to 85% by mass, with respect to the total solid components in the antireflective layer of the second aspect in the present invention.
(Binder Resin)

The binder resin of the antireflective layer of the second aspect in the present invention will be described.

As for the binder resin of the antireflective layer of the second aspect in the present invention, a contact angle of water with respect thereto is preferably 90° or more, and more preferably 100° or more from the following viewpoint. This means that the binder resin is hydrophobic. By this, surface tension of the binder resin at the interface with an air before curing becomes low, the binder has a good wettability with respect to the hard coat layer.

The contact angle of water with respect to the binder resin may be measured by providing a layer made of the binder resin on the substrate or the like.

The binder resin is obtained by, preferably, polymerizing the binder resin forming compound (polymerizable compound), and more preferably, coating and curing the composition for forming an antireflective layer containing the binder resin forming compound, the metallic oxide fine particles and a solvent.

The binder resin forming compound in the antireflective layer is the same as explained in the first aspect of the present invention.

The content of the binder resin is preferably 8.2% by mass to 37.4% by mass, more preferably 18.7% by mass to 33.7% by mass and 24.4% by mass to 29.4% by mass, with respect to the total solid component in the antireflective layer.
(Hard Coat Layer)

As for the hard coat layer of the second aspect in the present invention, a contact angle L of water with respect to the hard coat layer is preferably 50° or less, more preferably 30° or less, and further preferably 15° or less from the following viewpoint. This means that the hard coat layer is hydrophilic. By this, the binder resin of the antireflective film may be dispersed uniformly on the hard coat layer, and as a result, an antireflective layer having a desired uneven shape may be obtained.

The hard coat layer may be formed by, preferably, crosslinking reaction or polymerization reaction of an ionizing-radiation-curable compound. For example, the hard coat layer may be formed by coating a composition containing an ionizing-radiation-curable polyfunctional monomer or oligomer and being subjected the composition to crosslinking reaction or polymerization reaction.

As a functional group of the ionizing-radiation-curable polyfunctional monomer or oligomer, those of the hinder resin forming compound of the antireflective layer are also exemplified.

The film thickness of the hard coat layer is generally about 0.5 µm to 50 µm, and preferably 1 µm to 20 µm from the viewpoint of imparting sufficient durability and impact resistance to the film.

Further, the hardness of the hard coat layer is preferably H or higher, and more preferably 2H or higher as measured by a pencil hardness test. Further, in Taber test in accordance with JIS K5400, smaller abrasion loss of a test piece after the test is preferred.
(Other Components)

In addition to the above-mentioned components, a solvent, a polymerization initiator, an antistatic agent, and an anti-glare agent may be further added appropriately to the hard coat layer forming composition. Further, various additives such as a reactive or unreactive leveling agent and various sensitizers may be mixed therein.

The solvent, the polymerization initiator, the antistatic agent, and the anti-glare agent are the same as explained in the first aspect of the present invention. However, as for the solvent, from the viewpoint that hardness of an optical sheet may be improved, a combination of non-permeable solvents such as MIBK and isopropanol is preferable. By using the non-permeable solvents in combination, excessive infiltration of the binder component into triacetyl cellulose substrate may be prevented, and the hardness may be enhanced.
(Refractive Index Adjusting Agent)

In the binder of the hard coat layer of the second aspect in the present invention, a refractive index adjusting agent as explained in the first aspect of the present invention may be added.

As a method for adjusting a contact angle of water with respect to the hard coat layer to 50° or less, a method for subjecting the surface of the hard coat layer to a corona discharge treatment, a method for adding silica fine particles to the hard coat layer, and the like, are exemplified.

The corona discharge treatment may be performed by conventionally known method, for example, methods disclosed in Japanese Examined Patent Application Publication Nos. Sho48-5043, Sho47-51905, Sho47-28067, Sho49-83767, Sho51-41770 and Sho51-131576, Japanese Patent Laid-Open Publication No. 2001-272503, or the like.

As for other methods than the corona discharge treatment, a plasma treatment, a glow discharge treatment, a flame treatment, an ozone treatment, a UV ozone treatment, an ultraviolet treatment, and the like, are exemplified. These treatments may be performed singly or in combination.
(Substrate)

The substrate of the antireflective film of the second aspect in the present invention is not particularly limited as long as a substrate having a transparency, usually used as a substrate of an antireflective film, but a plastic substrate and a glass substrate are preferable.

As the plastic substrate, various substrates may be available, and examples thereof include a substrate containing: cellulose-based resin such as cellulose acylate (triacetate cellulose, diacetyl cellulose, acetate butyrate cellulose); a polyester resin such as polyethylene terephthalate; a (meth) acrylic resin, a polyurethane-based resin, polycarbonate, polystyrene, and olefin-based resin. A substrate containing cellulose acylate, polyethylene terephthalate, or a (meth) acrylic resin is preferred, a substrate containing cellulose acylate is more preferred, and a cellulose acylate film is still more preferred. As cellulose acylate, a substrate described in Japanese Patent Laid-Open Publication No. 2012-093723 may be preferably used.

The thickness of the plastic substrate is generally 10 µm to 1,000 µm, but, is preferably 20 µm to 200 µm, and more preferably 25 µm to 100 µm from the viewpoint of good handlability, high transparency, and sufficient strength. As for the transparency of the plastic substrate, the transmittance is preferably 90% or more.
(Other Functional Layer)

The hard coat layer of the second aspect in the present invention may include a functional layer other than the hard coat layer and the antireflective layer.

For example, an easily adhesive layer for imparting adhesive property to another layer, an antistatic layer for imparting antistatic property, or the like, may be provided, and a plurality of such functional layers may be provided.

The antireflective film of the second aspect in the present invention preferably has an integral reflectance of 3% or less in a wavelength region of 380 nm to 780 nm, and an integral reflectance of 2% or less is more preferable.

[Manufacturing Method for Antireflective Film]

Next, a method of manufacturing the antireflective film of the first aspect in the present invention will be explained below.

The method of manufacturing the antireflective film of the first aspect in the present invention is a method of manufacturing an antireflective film including a plastic substrate, a infiltration layer, metallic oxide fine particles having an average primary particle diameter of 50 nm to 250 nm, and an antireflective layer containing a viscosity increasing compound, in this order, wherein the antireflective layer has a moth-eye structure constituted by an uneven shape formed by the metallic oxide fine particles the method including: coating, on the plastic substrate or a functional layer provided above the plastic substrate, a compound for forming an antireflective layer, containing a (meth)acrylate compound having a molecular weight of 400 or less, the metallic oxide fine particles having an average primary particle diameter of 50 nm to 250 nm, and a solvent; infiltrating the (meth)acrylate compound into the plastic substrate of the functional layer provided above the plastic substrate in order for the metallic oxide fine particles to protrude from the surface of the antireflective layer opposite to the interface at a plastic substrate side; and polymerizing the (meth)acrylate compound to form a infiltration layer containing the (meth) acrylate compound and antireflective layer having a moth-eye structure formed by the metallic oxide fine particles.

In the above method, the solvent is volatilized by heating or the like.

Specific explanations of each component in the composition for an antireflective layer are as previously described.
(Permeable Solvent into Plastic Substrate)

A permeable solvent into plastic substrate of the first aspect in the present invention will be explained below.

The permeable solvent into plastic substrate is a solvent capable of dissolving the surface of the plastic substrate.

By using the solvent capable of dissolving the surface of the plastic substrate, the (meth)acrylate compound having a molecular weight of 400 or less permeates into the plastic substrate to uniformly form a moth-eye structure.

The solvent capable of dissolving the surface of the plastic substrate means a solvent that when a substrate with a size of 24 mm×36 mm (thickness: 80 µm) is immersed into the solvent in a bin of 15 ml for 60 seconds at room temperature (25° C.) and is taken out, and then the solution in which the substrate is immersed is analyzed by gel infiltration chromatography (GPC), a peak area of a substrate component is 400 mV/sec or more. If the substrate includes a plurality of layers, the substrate component is a component at the surface of the substrate. Also, a solvent that when a substrate with a size of 24 mm×36 mm (thickness: 80 µm) is immersed into the solvent in a bin of 15 ml for 24 hours at room temperature (25° C.), the substrate is completely dissolved by, for example, properly shaking, is also the solvent capable of dissolving the surface of the plastic substrate. The permeable solvent is preferably a solvent having not swellability to the substrate. The solvent having no swellability to the substrate means a solvent that when a substrate with a size of 24 mm×36 mm (thickness: 80 µm) is immersed into the solvent in a bin of 15 ml for 24 hours at room temperature (25° C.) and is taken out from the solvent, and then each side of the substrate is measured, the size after the immersion becomes larger than that before the immersion.

The permeable solvent into plastic substrate depends on a component constituting the plastic substrate. In the case of a cellulose acylate substrate, ethanol, isopropanol (IPA), methyl acetate, ethyl acetate, butyl acetate, acetone, or the like may be preferably used, but the permeable solvent is not limited thereto so long as the permeable solvent does not swell the substrate. Acetone and ethanol are preferable due to satisfactory compatibility with the metallic oxide fine particles.

In the case of an acrylic substrate, ethanol, IPA, dimethyl carbonate, methylethyl carbonate, diethyl carbonate, acetone, methyl ethyl ketone (MEK), cyclopentanone, cyclohexanone, methyl acetate, ethyl acetate, or the like may be preferably used.

In the case where the hard coat layer is provided as a functional layer, ethanol, IPA, MEK, acetone or the like is preferable.

The composition for forming antireflective layer may contain a solvent other than the permeable solvent into plastic substrate.

In the composition for forming antireflective layer, a content of the permeable solvent into substrate is preferably 5% by mass to 90% by mass, with respect to the total mass of the composition for forming antireflective layer, from the viewpoint of imparting coating property without preventing infiltration of the binder.

The solid concentration of the composition for forming antireflective layer is preferably 5% by mass to 90% by mass from the viewpoint of effectively forming the infiltration layer.

In the composition for forming antireflective layer, the sum of contents of the (meth)acrylate compound having a molecular weight of 400 or less, the viscosity increasing compound and the binder resin is 50% by mass to 97% by mass, with respect to the mass of the total solid composition in the composition for forming antireflective layer.
<Polymerization Initiator>

The composition for forming antireflective layer may contain a polymerization initiator.

When a polymerizable compound contained in the composition for forming antireflective layer is a photopolymerizable compound, it is preferable the photopolymerization initiator is contained.

As the photopolymerization initiator, acetophenoes, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophin dimers, onium salts, borate salts, active esters, active halogens, inorganic complexes, coumarins and the like are exemplified. Specific examples of the photopolymerization initiator and preferable embodiments thereof are disclosed in [0133] to [0151] of Japanese Patent Laid-Open Publication No. 2009-098658, and they may be appropriately applicable to the second aspect in the present invention.

Other various examples are also disclosed in "Latest UV curing technique" issued by TECHNICAL INFORMATION INSTITUTE CO., LTD. in 1991, p. 159, and "Ultraviolet curing system", author of Kiyoshi Kato, issued by prefectural technical center in 1989, p. 65 to 148, they may be applicable to the second aspect in the present invention.

A content of the photopolymerization initiator in the composition for forming antireflective layer is preferably 0.5% by mass to 8% by mass, and more preferably 1% by mass to 5% by mass, with respect to the total solid content in the composition for forming antireflective layer for the reason that the content is set to a sufficient large amount for polymerizing the polymerizable compound in the composition for forming antireflective layer and a sufficient small amount for not excessively increasing a starting point.

A coating method of the composition for forming antireflective layer is not particularly limited, and known method may be used. For example, a dip coating method, an air knife coating method, a curtain coating method, a roller coating method, a wire bar coating method, a gravure coating method. a die coating method and the like are exemplified.

When the composition for forming antireflective layer is coated on the plastic substrate, the permeable solvent into the plastic solvent permeates into the plastic substrate. At this time, the (meth)acrylate compound having a molecular weight of 400 or less as well permeates into the plastic substrate. Then, the curable compound for forming a binder resin is cured by ionizing radiation irradiation or heating to form the infiltration layer and the antireflective layer. The thickness of the infiltration layer preferably has a thickness twice as thick as that of the antireflective layer. By this method, a fine moth-eye structure may be formed after the coating without aggregation of the particles before the coating.

A content of the metallic oxide fine particles in the composition for forming antireflective layer is preferably 5% by mass to 50% by mass, more preferably 10% by mass to 45% by mass, and further preferably 15% by mass to 40% by mass, with respect to the total solid components. In the case of the lower limit or more, antireflection property tends to be improved because a large number of convex portions in a moth-eye structure are formed. In the case of the upper limit or less, a moth-eye structure is facilitated to be formed because aggregation of the particles hardly occurs.

A content of the viscosity increasing compound or a compound to be the viscosity increasing compound by polymerization in the composition for forming antireflective layer is preferably 1% by mass to 95% by mass, more preferably 5% by mass to 90% by mass, and further preferably 10% by mass to 85% by mass, with respect to the total solid components.

A content ratio of the metallic oxide fine particles and the viscosity increasing compound in the composition for forming antireflective layer preferably satisfies the following relationship. A ratio of (mass of the metallic oxide fine particles) to (the total mass of the viscosity increasing compound, the binder resin and (meth)acrylate compound having a molecular weight of 400) is preferably 10/90 to 95/5, more preferably 20/80 to 90/10, and further preferably 30/70 to 85/15. When the ratio is 10/90 or more, it is preferable that the B/A value of the uneven shape in a moth-eye structure becomes large so that reflectance is reduced. When the ratio is 95/5 or less, it is preferable that adhesive property between the metallic oxide fine particles and the substrate becomes high and the metallic oxide fine particles are difficult to be aggregated in the manufacturing process so that defects or haze do not occurs and reflectance is not deteriorated.

Next, a method of manufacturing the antireflective film of the second aspect in the present invention will be explained below.

The method of manufacturing the antireflective film of the second aspect in the present invention is not particularly limited, but a manufacturing method using a coating method is preferably from the viewpoint of productivity.

The method of manufacturing the antireflective film of the second aspect in the present invention is a method including, in this order, a substrate, a hard coat layer, and an antireflective layer containing metallic oxide fine particles with an average primary particle diameter of 50 nm to 380 nm and a binder resin, wherein the hard coat layer and the antireflective layer are in contact with each other, the antireflective film has a moth-eye structure constituted by an uneven shape formed by the metallic oxide fine particles, the surface of the antireflective film has a particle occupancy ratio of 40% to 90%, and the uneven shape satisfies the following formulae (2) and (3):

$$R/2 \leq K \leq 9R/10 \quad \text{Formula (2)}$$

$$\sigma \leq 40 \quad \text{Formula (3)},$$

wherein K represents an average value of a distance B, $\sigma$ represents a standard deviation of a distribution of the distance B, and R represents an average primary particle diameter of the metallic oxide fine particles, the method including: forming the hard coat layer on the substrate; and coating and curing, on the hard coat layer, a composition for forming antireflective layer containing the metallic oxide fine particles with an average primary particle diameter of 50 nm to 380 nm and a compound for forming the binder resin.

In the above method, it is preferable that the metallic oxide fine particles and the hard coat layer used in the second aspect in the present invention satisfy the following formulae (4) and (5).

$$-120M+130 \geq L \quad \text{Formula (4)}$$

$$L \leq 50° \quad \text{Formula (5)}$$

Here, when they are dispersed in 11 kinds of ethanol/acetone mixed solvent varying a mass ratio of ethanol to the whole solvent from 0 to 1 by 0.1, M represents a mass ratio of ethanol to the whole mixed solvent in a mixed solvent in which precipitation of the metallic oxide fine particles is the slowest, and L represent a contact angle of water with respect to the hard coat layer.

Also, the contact angle of water with respect to the binder resin in the antireflective layer is preferably 90° or more.

In the method of manufacturing the antireflective film of the second aspect in the present invention, the substrate, the hard coat layer, the binder resin in the antireflective layer, and the metallic oxide fine particles may be those used in the antireflective film of the second aspect in the present invention.

According to the above method, without a treatment such as etching, the antireflective film may be manufactured by a coating method only. Thus, an antireflective film having a fine moth-eye structure and high hardness may be manufactured at low cost.

The composition for forming antireflective layer may contain a solvent, a polymerization initiator, a metallic complex compound, dispersant of particles, a leveling agent, an antifouling agent or the like, in addition to the metallic oxide fine particles and the compound for forming binder resin.

As the solvent, a solvent having similar polarity to the metallic oxide fine particles is preferable from the viewpoint of improving dispersibility. Specifically, alcohol-based solvents such as methanol, ethanol, 2-propanol, 1-propanol and butanol are preferable. In a case where the metallic oxide fine particles subjected to hydrophobing-surface-modification, solvents such as a ketone-based solvent, an ester-based solvent, a carbonate-based solvent, an alkane, an aromatic-based solvent and the like are preferable. Specific examples thereof include methyl ethyl ketone, dimethyl carbonate, methyl acetate, acetone, methylene chloride, cyclohexanone and the like. Two or more kinds of these solvents may be mixed so long as dispersibility is remarkably deteriorated.

The dispersant of particles has a function that particles may be uniformly dispersed by lowering aggregation force of the particles. The dispersant is not particularly limited, but is preferably an anionic compound such as sulfate and phosphate, a cationic compound such as an aliphatic amine salt and a quaternary ammonium salt, a nonionic compound, or a polymer compound, and more preferably a polymer compound because of high degree of freedom of selection for each of adsorptive groups and sterically repulsive groups. The dispersant may be commercially available. Examples thereof may include DISPERBYK 160, DISPERBYK 161, DISPERBYK 162, DISPERBYK 163, DISPERBYK 164, DISPERBYK 166, DISPERBYK 167, DISPERBYK 171, DISPERBYK 180, DISPERBYK 182, DISPERBYK 2000, DISPERBYK 2001, DISPERBYK 2164, Bykumen, BYK-P104, BYK-P104S, BYK-220S, Anti-Terra203, Anti-Terra204, and Anti-Terra205 (all trade names), manufactured by BYK-Chemie Japan K. K.

The leveling agent has a function that by lowering surface tension of the compound for forming antireflective layer, a coated liquid is made stable and the particles and the binder resin tend to be uniformly dispersed. For example, compounds disclosed in Japanese Patent Laid-Open Publication Nos. 2004-331812 or 2012-88699, and the like, may be used.

The antifouling agent has a function that by imparting water- or oil-repellent to a moth-eye structure, adhesion of stain or fingerprint may be prevented. For example, compounds disclosed in Japanese Patent Laid-Open Publication No. 2012-88699, and the like, may be used.

(Polymerization Initiator)

The composition for forming antireflective layer preferably contains a photopolymerization initiator when a polymerizable compound contained in the composition for forming antireflective layer is a photopolymerizable compound. The examples of the photopolymerization initiator are the same as those explained in the first aspect of the present invention.

A coating method of the composition for forming antireflective layer is not particularly limited, and known method may be used. For example, a dip coating method, an air knife coating method, a curtain coating method, a roller coating method, a wire bar coating method, a gravure coating method, a die coating method and the like are exemplified.

From the viewpoint of uniform coating, the solid concentration in the composition for forming antireflective layer is preferably 10% by mass to 80% by mass, and more preferably 20% by mass to 60% by mass.

[Polarizing Plate Protective Film]

The antireflective laminate (antireflective film) may be used as a surface protective film of the polarizing film (polarizing plate protective film).

Among two polarizer protective films, a film other than the antireflective film of the present invention is also preferably an optically-compensatory film having an optically-compensatory layer including an optically anisotropic layer. The optically-compensatory film (phase-difference film) may improve a viewing angle characteristic of a liquid display screen. Any known optically-compensatory film may be used, but, from the viewpoint of widening the viewing angle, the optically-compensatory film described in Japanese Patent Laid-Open Publication No. 2001-100042 is preferred.

Before lamination with the polarizer, the antireflective film of the first aspect in the present invention may be subjected to a saponification treatment. The saponification treatment is a treatment in which an optical film is immersed in a warm aqueous alkaline solution for a certain period of time, washed with water, and then washed with acid for neutralization. If a surface of a transparent support that adheres to the polarizing film is hydrophilized, since any treatment condition is available, a concentration of a treatment agent, a temperature of a treatment agent liquid, and a treatment time are appropriately determined. However, in general, the treatment conditions are decided so as to perform the treatment within 3 minutes for a need to ensure productivity. In general conditions, the alkali concentration is 3% by mass to 25% by mass, the treatment temperature is 30° C. to 70° C., and the treatment time is 15 seconds to 5 minutes. As the alkali species used in an alkali treatment, sodium hydroxide or potassium hydroxide is suitable. As the acid used in the acid-washing, sulfuric acid is suitable. As the water used in the water-washing, ion-exchange water or deionized water is suitable.

The surface of the plastic substrate opposite to that provided with the antireflective layer of the first aspect in the present invention is subjected to a saponification treatment, and boned to the polarizer using an aqueous polyvinyl alcohol solution.

Further, a UV-curable adhesive may be used in bonding the antireflective film of the first aspect in the present invention and the polarizer. It is preferred to provide a UV-curable adhesive layer on the surface of the plastic substrate opposite to that provided with the antireflective layer of the first aspect in the present invention. Specifically, it is preferred to bond to the polarizer using a certain UV-curable resin for the purpose of enhancing the productivity by a short time dry.

[Polarizing Plate]

The polarizing plate of the first aspect in the present invention is a polarizing plate having a polarizer and at least one protective film that protects the polarizer, and the at least one sheet of the protective films is the antireflective film of the first aspect in the present invention. The polarizer may be sandwiched between the protective film and the phase difference film or may be a combination of the protective film and the polarizer.

The polarizer includes an iodine-based polarizing film, a dye-based polarizing film using dichroic dye, or a polyene-based polarizing film. The iodine-based polarizing film and the dye-based polarizing film may be generally manufactured using a polyvinyl alcohol-based film.

The polarizing plate of the second aspect in the present invention is a polarizing plate having a polarizer and at least one protective film that protects the polarizer, and the at least one sheet of the protective films is the antireflective film of the second aspect in the present invention.

With respect to the manufacturing method of the polarizing plate of the second aspect in the present invention, the method as explained in the manufacturing method of the polarizing plate of the first aspect in the present invention may be used.

[Cover Glass]

An cover glass of the first aspect in the present invention includes the antireflective film of the first aspect in the present invention as a protective film.

An cover glass of the second aspect in the present invention includes the antireflective film of the second aspect in the present invention as a protective film.

The cover glass may include a glass substrate of the antireflective film, or include a glass support on which the antireflective film including the plastic substrate is laminated.

[Image Display Device]

An image display device of the first aspect in the present invention includes the antireflective film or the polarizing plate of the first aspect in the present invention.

An image display device of the second aspect in the present invention includes the antireflective film or the polarizing plate of the second aspect in the present invention.

The antireflective film and the polarizing plate of the present invention may be suitably used in an image display device such as a liquid crystal display (LCD), a plasma display (PDP), an electroluminescence display (ELD), or a cathode ray tube display (CRT), and a liquid crystal display is particularly preferred.

In general, the liquid crystal display has a liquid crystal cell and two polarizing plates disposed at both sides thereof, and the liquid crystal cell carries liquid crystal between two electrode substrates. Further, one optically anisotropic layer may be disposed between the liquid cell and one of the polarizing plates, or two may be disposed between the liquid crystal cell and both of the polarizing plates. The liquid cell is preferably in a TN mode, a VA mode, an OCB mode, an IPS mode, or an ECB mode.

EXAMPLES

The invention will now be illustrated in more detail by reference to the following examples. As to the materials, the reagents, the amounts and proportions of the materials and the operations in the following examples, changes and modifications can be made as appropriate so long as they do not depart from the spirit and scope of the invention. Accordingly, the scope of the invention should not be construed as being limited to the following examples.

The following experiments were performed on the first aspect in the invention.

[Synthesis of Silica Particles a-1]

Into a 200 L of reaction vessel equipped with a stirrer, a dropping device and a thermometer, 67.54 kg of methyl alcohol and 26.33 kg of 28% by mass of ammonia water (water and a catalyst) were charged, and the liquid temperature was adjusted to 33° C. with stirring. On the other hand, a solution prepared by dissolving 12.70 kg of tetramethoxysilane in 5.59 kg of methyl alcohol was charged into the dropping device. The solution was dripped from the dropping funnel over a period of 1 hour as the liquid temperature in the reaction vessel was kept at 33° C., and after the completion of dripping the stirring was further continued for 1 hour as the liquid temperature was kept at the foregoing temperature. In this manner, the hydrolysis and condensation of tetramethoxysilane were performed, and thereby a dispersion containing precursors of silica particles was prepared. This dispersion was subjected to airflow drying by using a flash vacuum dryer (Clax System CVX-8B type, made by Hosokawa Micron Corp.) on conditions that the heating tube temperature be set at 175° C. and the degree of pressure reduction be controlled to 200 torr (27 kPa), and thereby silica particles a-1 were obtained. The thus obtained silica particles were 200 nm in average primary particle size and 3.5% in dispersibility of particle sizes (Cv value). In addition, it had an indentation hardness of 330 MPa.

[Preparation of Silica Particles a-2]

A dispersion sol of silica-base hollow fine particles in an amount of 25 kg (Sururia 1420-120, average particle size: 120 nm, concentration: 20.5% by mass, dispersion medium: isopropanol, refractive index of particles: 1.20, made by JGC C&C) was charged into a crucible and placed in a 100° C. oven to evaporate the isopropanol, and thereby silica particles a-2 were obtained. The thus obtained silica particles were 120 nm in average primary particle size and 5.0% in dispersibility of particle sizes (Cv value). In addition, it had an indentation hardness of 300 MPa.

[Preparation of Pyrogenic Silica Particles b-1]

The silica particles a-1 in an amount of 5 kg were charged into a crucible, and calcinated at 900° C. for 1 hour by means of an electric furnace, then cooled, and subsequently pulverized by means of a pulverizer, thereby giving pre-sized, pyrogenic silica particles. Further, these particles were subjected to crushing and classification by means of a jet crusher classifier (Model IDS-2, made by Nippon Pneumatic Mfg. Co., Ltd.), and thereby pyrogenic silica particles b-1 were obtained. The thus obtained pyrogenic silica particles were 200 nm in average primary particle size and 3.5% in dispersibility of particle sizes (Cv value). In addition, it had an indentation hardness of 400 MPa.

[Preparation of Silane Coupling Agent-Treated Silica Particles c-1]

The pyrogenic silica particles b-1 before sizing were charged in an amount of 5 kg into a 20 L of Henschel Mixer provided with a heating jacket (Model FM20J, made by Nippon Coke & Engineering Co., Ltd.). A solution prepared by dissolving 45 g of 3-acryloxypropyltrimethoxysilane (KBM5103, made by Shin-Etsu Chemical Co. Ltd.) in 90 g of methyl alcohol was dripped into the pyrogenic silica particles b-1 under stirring, and thereby they were mixed together. Thereafter, heating treatment was performed by raising the temperature of the resulting mixture to 150° C. over a period of about 1 hour with stirring and then keeping the temperature of the mixture at 150° C. for 12 hours. During the heating treatment, adherents to the wall surface were scraped off as a scraping-off device was continuously rotated in the direction opposite to that of its stirring blades. In addition, the adherents were also scraped off by using a spatula as appropriate. After the heating, cooling was performed, and crushing and classification were performed by means of a jet crusher classifier, and thereby silane coupling agent-treated particulate silica c-1 was obtained. The thus obtained silica particles was 200 nm in average primary particle size and 3.7% in dispersibility of particle sizes (Cv value). In addition, it had an indentation hardness of 400 MPa.

[Indentation Hardness Measurement Made on Metallic Oxide Fine Particles]

Into 91 g of methanol were charged 8 g of each metallic oxide fine particles, 0.3 g of IRUGACURE 184 (a product of BASF Japan Ltd.) and 7.7 g of KAYARAD PET30 (a product of Nippon Kayaku Co., Ltd.), stirring was carried out for 10 minutes, and then dispersion was carried out for 10 minutes by means of an ultrasonic dispersing machine, thereby preparing a 15% by mass of dispersion. A coating of this dispersion was applied to a glass plate in a wet amount of about 3 ml/m$^2$, and cured by being irradiated with ultraviolet light from an air-cooled metal halide lamp at an irradiation dose of 600 mJ/cm$^2$ as a purge of air with nitrogen was conducted so as to achieve an atmosphere with an oxygen concentration lower than 0.1 vol %. Thereafter, it was ascertained by observation under SEM that metallic oxide fine particles were not stacked two or more high. On the thus obtained sample, measurement of indentation hardness of the metallic oxide fine particle was made by using a Tribo Indenter (TI-950, a product of Hysitron Inc.) on measurement conditions that a diamond indenter with a diameter of 1 μm be used and an indentation load be set at 0.05 mN.

[Preparation of Silica Particle Dispersion]

Into a mixing tank made of glass were charged 70 parts by mass of ethanol and 30 parts by mass of the silica particles a-1, and stirring was carried out for 10 minutes. Further, ultrasonic dispersion was carried out for 30 minutes as the stirring was continued, and thereby a silica particle dispersion a-1 with a solid concentration of 30% was prepared. Silica particle dispersions a-2 to a-4 were prepared in the same manner as the silica particle dispersion a-1, except that the silica particles a-1 and the ethanol were replaced in order for the dispersions a-2 to a-4 to have compositions as shown in Table 1, respectively. The concentrations of coating dispersions were "% by mass".

TABLE 1

|  | a-1 | a-2 | a-3 | a-4 |
|---|---|---|---|---|
| Ethanol | 70 | 70 | 70 | 35 |
| Acetone |  |  |  | 35 |
| Silica particles a-1<br>200 nm, 330 MPa, Cv value: 3.5% | 30 |  |  |  |
| Silica particles a-2<br>120 nm, 300 MPa, Cv value: 5.0% |  |  | 30 |  |
| Pyrogenic silica particles b-1<br>200 nm, 400 MPa, Cv value: 3.5% |  | 30 |  |  |
| Silane coupling agent-treated silica particles c-1<br>200 nm, 400 MPa, Cv value: 3.7% |  |  |  | 30 |
| Concentration of dispersion | 30% | 30% | 30% | 30% |

[Preparation of Composition for Forming Antireflective Layer]

Addition of various ingredients was made so that a composition for forming antireflective layer A-1 shown in the following Table 2 was obtained, and the composition obtained was charged into a mixing tank, stirred for 60 minutes, dispersed for 30 minutes by means of an ultrasonic dispersing machine, and then filtered through a polypropylene filter having a pore diameter of 5 μm. Thus, a coating solution A-1 (with a solid concentration of 20% by mass) for forming antireflective layer was prepared.

Compositions for forming antireflective layer A-2 to A-13 were prepared in the same manner as the composition for forming antireflective layer A-1, except that various ingredients were mixed so as to form compositions as shown in Table 2, respectively, and adjusted to have compositional ratios (on a mass basis) as shown in Table 2.

In the following Table 2, the numerical value of each ingredient represents an amount added (parts by mass). Additionally, the unit of the concentration of each coating solution is "% by mass".

(Method of Viscosity Measurement)

Viscosity values of viscosity increasing compounds, binder resins and (meth)acrylate compounds having a molecular weight of 400 or lower were measured at a heating temperature 100° C. and a shearing velocity of 17.8 (1/s) by means of a heat rheometer Physica MCR301 (a product of Anton Paar Inc.).

TABLE 2

|  |  | Concentration | A-1 | A-2 | A-3 | A-4 | A-5 | A-6 | A-7 |
|---|---|---|---|---|---|---|---|---|---|
| Viscosity Increasing Compound | DPHA<br>viscosity (100° C.) = 31 mPa · s | 100% | 30 | 10 | 10 |  |  |  |  |
|  | #802<br>viscosity (100° C.) = 58 mPa · s |  |  |  |  |  | 10 |  |  |
|  | U-4HA<br>viscosity (100° C.) = 57 mPa · s | 100% |  |  |  |  |  | 10 | 10 | 
|  | PET30-BR-45 mixture<br>viscosity (100° C.) = 95 mPa · s |  |  |  |  |  |  |  |  |
|  | PET30-UR8300 mixture<br>viscosity (100° C.) = 70 mPa · s |  |  |  |  |  |  |  |  |
| (Meth)acrylate Compound having Molecular weight of 400 or lower | PET30<br>viscosity (100° C.) = 11 mPa · s |  |  |  |  | 20 | 20 | 20 |  |
|  | A-TMPT<br>viscosity (100° C.) = 2 mPa · s | 100% |  |  |  |  |  |  | 20 |  |
|  | GMR<br>viscosity (100° C.) < 1 mPa · s |  |  |  |  |  |  |  | 20 |
| Silica Particle Dispersion | a-1 | 30% | 63 | 63 | 63 | 63 | 63 | 63 | 63 |
|  | a-2 | 30% |  |  |  |  |  |  |  |
|  | a-3 | 30% |  |  |  |  |  |  |  |
|  | a-4 | 30% |  |  |  |  |  |  |  |
| Others | IRUGACURE184 | 100% | 2 | 2 | 2 | 2 | 2 | 2 | 2 |
|  | Ethanol |  | 156 | 156 | 156 | 156 | 156 | 156 | 156 |
| Concentration of Solution |  |  | 20% | 12% | 20% | 20% | 20% | 20% | 20% |
| Particles/(Viscosity increasing compound + (Meth)acrylate Compound having Molecular weight of 400 or lower) |  |  | 39/61 | 68/32 | 39/61 | 39/61 | 39/61 | 39/61 | 39/61 |
| Viscosity increasing compound/Solid Components |  |  | 59% | 32% | 20% | 20% | 20% | 20% | 20% |

|  |  | Concentration | A-8 | A-9 | A-10 | A-11 | A-12 | A-13 |
|---|---|---|---|---|---|---|---|---|
| Viscosity Increasing Compound | DPHA<br>viscosity (100° C.) = 31 mPa · s | 100% |  |  |  |  |  |  |
|  | #802<br>viscosity (100° C.) = 58 mPa · s |  |  |  |  | 10 | 10 | 10 |
|  | U-4HA<br>viscosity (100° C.) = 57 mPa · s | 100% |  |  |  |  |  |  |
|  | PET30-BR-45 mixture<br>viscosity (100° C.) = 95 mPa · s |  |  |  | 10 |  |  |  |
|  | PET30-UR8300 mixture<br>viscosity (100° C.) = 70 mPa · s |  |  | 10 |  |  |  |  |

TABLE 2-continued

| (Meth)acrylate Compound having Molecular weight of 400 or lower | PET30 viscosity (100° C.) = 11 mPa·s | | 20 | 20 | 20 | 20 | 20 | |
|---|---|---|---|---|---|---|---|---|
| | A-TMPT viscosity (100° C.) = 2 mPa·s | 100% | | | | | | |
| | GMR viscosity (100° C.) < 1 mPa·s | | | | | | | 30 |
| Silica Particle Dispersion | a-1 | 30% | 63 | 63 | | | | 63 |
| | a-2 | 30% | | | 63 | | | |
| | a-3 | 30% | | | | 63 | | |
| | a-4 | 30% | | | | | 63 | |
| Others | IRUGACURE184 | 100% | 2 | 2 | 2 | 2 | 2 | 2 |
| | Ethanol | | 156 | 156 | 156 | 156 | 156 | 156 |
| Concentration of Solution | | | 20% | 20% | 20% | 20% | 20% | 20% |
| Particles/(Viscosity increasing compound + (Meth)acrylate Compound having Molecular weight of 400 or lower) | | | 39/61 | 39/61 | 39/61 | 39/61 | 39/61 | 39/61 |
| Viscosity increasing compound/Solid Components | | | 20% | 20% | 20% | 20% | 20% | 0% |

Each of the Compounds Used is Described Below

DPHA: KAYARAD, a product of Nippon Kayaku Co., Ltd.
DPHA#802: Viscoat #802, a product of Osaka Organic Chemical Industry Ltd.
PET30: KAYARAD, a product of Nippon Kayaku Co., Ltd.
PET30U-4HA: NK Oligo, a product of Shin-Nakamura Chemical Co., Ltd.
U-4HAA-TMP T: NK Ester, a product of Shin-Nakamura Chemical Co., Ltd.
A-TMP T GMR: Blemmer, a product of NOF Corporation.
GMRBR-85: PMMA Dianal, a product of Mitsubishi Rayon Co., Ltd.
BR-85UR-8300: Urethane-modified copolymerized polyester resin Vylon UR-8300, a product of TOYOBO Co., Ltd.
IRUGACURE 184: photo-polymerization initiator, a product of BASF Japan Ltd.

Example 1

(Making of Antireflective Film)

To PET (COSMOSHINE A4100, a product of TOYOBO Co., Ltd.) as a 100 µm-thick substrate, a coating solution of composition for forming antireflective layer A-1 was coated in a wet amount of about 2.8 ml/m$^2$ by a gravure coater, dried at 120° C. for 5 minutes, and then cured by being irradiated with ultraviolet light from an air-cooled metal halide lamp at an irradiation dose of 600 mJ/cm$^2$ as a purge of air with conducting nitrogen so as to achieve an atmosphere with an oxygen concentration lower than 0.1 vol %, thereby preparing an antireflective film A-1. Herein, fine adjustments were made to the wet coating amount and the particle occupancy was measured every time fine adjustment was made. What had the highest particle occupancy was adopted as the antireflective film A-1. An antireflective film A-2 was prepared in the same manner as the antireflective film A-1, except that the substrate was changed from PET to cellulose triacetate film (TG40UL, TAC, a product of FUJIFILM Corporation). In addition, antireflective films A-3 to A-14 were prepared in the same manner as described above, except that the substrate was changed from PET to cellulose triacetate film (TG40UL, TAC, a product of FUJIFILM Corporation), the coating solution of composition for forming antireflective layer A-1 was replaced with coating solution of the composition for forming antireflective layer A-2 to A-13, respectively, and the wet coating amount was set at the same as that in the antireflective film A-1.

(Evaluation of Antireflective Film)

Evaluations of various characteristics were performed on the antireflective films by the use of the following methods. Results obtained are shown in Table 3.

(Confirmation of Infiltration Layer)

The cross-section of each sample cut out in a piece of about 3 mm square was thinned into slices having a piece number of 10 nm through the use of a microtome and electrolytic polishing, and confirmed by observation under TEM (transmission electron microscope).

(Integral Reflectance)

The back side of an antireflective film (the PET film side or the cellulose triacetate film side) was roughened with sandpaper, and treated with black ink to result in removal of reflection on the back side. In this situation. integral reflectance of the antireflective film was measured at an incident angle of 5° in a wavelength region of 380 nm to 780 nm by means of a spectrophotometer V-550 (made by JASCO Corporation) equipped with an adaptor ARV-474 and an average reflectance was calculated, and therefrom the antireflective property was evaluated.

(B/A and Half Width of a Distribution)

A sample of each antireflective film was cut with a microtome so as to expose its cross section. carbon was vaporized onto the cross section, and then the resulting cross section was subjected to etching treatment for 10 minutes. The thus treated cross section was observed in 20 visual fields thereof under a scanning electron microscope (SEM) at a magnification of 5,000, and photographs thereof were taken. On each of 100 spots on the photographs obtained were made measurements of the distance A defined as the distance between the apexes of adjacent convex portions at the interface formed by air and the sample and the distance B defined as the distance between the middle of between the apexes of the adjacent projections and the concave portion. And therefrom, an average of B/A values was calculated. Further, the half width of distribution of the measured A values was also calculated.

(Evaluation of Scratch Resistance by Steel Wool)

Rubbing tests for the antireflective layer surface of each antireflective film were carried out by using a rubbing tester on the following conditions, and results thereof were adopted as an index of scratch resistance.

Environmental conditions at evaluation time: 25° C., 55% RH

Rubbing material: Steel wool (#0000 count, a product of Nippon Steel Wool Co., Ltd.) coiled around tester's rubbing tip (1 cm×1 cm) to come into contact with samples and fastened with a band Moving distance (one way): 13 cm Rubbing speed: 13 cm/sec Load: 150 g/cm²
Contact area of tip: 1 cm×1 cm
Number of rubbing motions: 10 rounds A coating of black ink was applied to the back of each sample having finished the rubbing test, and by visual observation of light reflected from the sample, and the abrasion on the rubbed area were evaluated.

A: No scratch is observed even by very careful observation

B: Although slight scratch is observed by very careful observation, they are few in number and none of them constitutes a matter of concern C: Although slight scratch is observed by careful observation, none of them constitutes a matter of concern D: Moderate scratch is observed, which is conspicuous.

E: There are scratch recognized at a glance, and it is very easy to see.

(Haze)

Total haze values (%) of the films obtained were determined according to JIS-K 7136. The device used for haze measurements was a haze meter NDH4000 manufactured by Nippon Denshoku Industries Co., Ltd.

Example 2

[Preparation of Plastic Substrate with Hard Coat Layer]
(Preparation of Composition for Forming Hard Coat Layer)

Into a mixing tank, 10.5 parts by mass of methyl acetate, 10.5 parts by mass of MEK, 22.52 parts by mass of PET, 6.30 parts by mass of urethane monomer (U-4HA) and 0.84 parts by mass of IRUGACURE 184 were charged, stirred and subjected to filtering through a polypropylene filter having a pore diameter of 0.4 μm, thereby preparing a hard coat layer composition B-1 (solid matter concentration of 58 mass %).

Likewise, a hard coat layer composition B-2 was prepared in the same manner as the hard coat layer composition B-1, except that the proportions of the ingredients were changed so as to make up the composition shown in Table 4. The numerical value pertinent to each ingredient in Table 4 is in parts by mass.

(Preparation of Plastic Substrate with Hard Coat Layer)

To a cellulose triacetate film (TG40UL, a product of Fujifilm Holdings Corporation), a hard coat layer composition B-1 was coated by a gravure coater. After drying at 60°

TABLE 3

| Sample Name | Coating Solution for Forming Anti-Reflective Layer | Substrate | Infiltration Layer μm | Reflectance | Steel Wool | B/A | Half-Width of A Distribution nm | Haze % | |
|---|---|---|---|---|---|---|---|---|---|
| A-1 | A-1 | PET | 0 | 4.0% | A | 0 | 20 | 0.7 | Compar. Ex. |
| A-2 | A-1 | TAC | 0.2 | 3.5% | A | 0.2 | 30 | 0.8 | Compar. Ex. |
| A-3 | A-2 | TAC | 0.5 | 2.4% | D | Impossible to measure | Impossible to measure | 10.0 | Compar. Ex. |
| A-4 | A-3 | TAC | 2 | 1.1% | B | 0.6 | 50 | 1.8 | Example |
| A-5 | A-4 | TAC | 2 | 1.0% | B | 0.7 | 40 | 1.2 | Example |
| A-6 | A-5 | TAC | 2 | 0.9% | B | 0.8 | 30 | 0.9 | Example |
| A-7 | A-6 | TAC | 2.5 | 0.8% | B | 0.8 | 30 | 0.9 | Example |
| A-8 | A-7 | TAC | 3 | 0.6% | B | 0.9 | 20 | 0.8 | Example |
| A-9 | A-8 | TAC | 2 | 1.0% | C | 0.8 | 40 | 1.0 | Example |
| A-10 | A-9 | TAC | 2 | 0.9% | C | 0.8 | 30 | 0.9 | Example |
| A-11 | A-10 | TAC | 2 | 1.0% | B | 0.8 | 80 | 1.5 | Example |
| A-12 | A-11 | TAC | 2 | 1.5% | B | 0.6 | 80 | 0.5 | Example |
| A-13 | A-12 | TAC | 2 | 1.0% | A | 0.7 | 60 | 1.5 | Example |
| A-14 | A-13 | TAC | 5.5 | 2.3% | E | 0.95 | 50 | 8.0 | Compar. Ex. |

As shown in Table 3, it has been ascertained that moth-eye structures and infiltration layers were present in the antireflective film samples according to the first embodiment of the invention and every one of these samples exhibited high reflectance and excellent scratch resistance. And it has been found that the samples incorporating urethane compounds as their viscosity increasing compounds (Samples A-6, 7, 8 and 10) were low in reflectance and haze in particular, which situation indicates that these samples allowed effective prevention of particle aggregation. Further, in the cases where viscosity increasing compounds functioned also as binders (Samples A-4 to A-6 and Samples A-11 to A-13), it has been found that the scratch resistance in particular was excellent. On the other hand, in the comparative sample A-1, neither haze nor particle aggregation occurred, but no moth-eye structure was formed because of the absence of infiltration layer to result in the reflectance being increased. In the comparative sample A-2 also, the infiltration layer was thin because of the absence of (meth)acrylate compound having a molecular weight of 400 or lower; as a result, the moth-eye structure formed was obscure and high reflectance developed. In the comparative sample A-14, particle aggregation occurred because of the absence of viscosity increasing compound, and thereby deterioration in reflectance and haze were caused.

C., the coating layer (coated hard coat layer composition B-1) was cured by being irradiated with ultraviolet light from a 160 W/cm of air-cooled metal halide lamp (a product of EYE GRAPHICS CO., LTD.) at an irradiation dose of 20 mJ/cm² as a purge of air with nitrogen was conducted so as to achieve an atmosphere with an oxygen concentration of 1 vol %, and thereby a hard coat layer having a thickness of 6 μm was formed. Thus a hard-coat-layer-equipped plastic substrate B-1 was made.

Likewise, a hard-coat-layer-equipped plastic substrate B-2 was made in the same manner as the hard-coat-layer-equipped plastic substrate B-1, except that the hard coat layer coating solution B-1 was replaced with the hard coat layer coating solution B-2. In addition, a hard-coat-layer-equipped plastic substrate B-3 was made in the same manner as the above, except that the hard coat layer coating solution B-1 was replaced with the hard coat layer coating solution B-2 and the irradiation dose was changed to 300 mJ/cm².

[Preparation of Antireflective Film]
(Preparation of Composition for Forming Antireflective Film)

In the same manner as in Example 1 using the antireflective layer forming composition A-1, a coating of the antireflective layer forming composition A-12 was coated to each of the film samples B-1 to B-3 by a gravure coater, dried at 120° C. for 5 minutes, and then cured by being irradiated with ultraviolet light from an air-cooled metal halide lamp at an irradiation dose of 600 mJ/cm² as a purge of air with nitrogen was conducted so as to achieve an atmosphere with an oxygen concentration of 0.1 vol % or less, thereby making each of antireflective films B-1 to B-3.

TABLE 4

|  | Concentration | B-1 | B-2 |
|---|---|---|---|
| Methyl Acetate |  | 10.5 | 17.5 |
| MEK |  | 10.5 | 17.5 |
| PET 30 | 100% | 22.52 | 11.40 |
| U-4HA | 100% | 6.3 | 3.2 |
| IRUGACURE 184 | 100% | 0.84 | 0.40 |
| Concentration of Coating Solution |  | 58% | 30% |

(Pencil Hardness)

The pencil hardness evaluation described in MS K5400 was performed. Each of the antireflective film samples was subjected to moisture conditioning for 3 hours at a temperature of 25° C. and a humidity of 60% RH, and then on the antireflective layer surface of each sample was done the test using a test pencil as defined by JIS S6006. And evaluation was made on the basis of the following criteria.

A: No indentations are seen after the test

B: Slight indentations are seen after the test, but none of them constitutes a matter of concern C: Serious indentations are seen after the test, and they are conspicuous.

TABLE 5

| Sample Name | Coating Solution for Forming Antireflective layer | Substrate | Reflectance | Steel Wool | Pencil Hardness 2H | |
|---|---|---|---|---|---|---|
| B-1 | A-12 | B-1 | 1.4% | A | A | Example |
| B-2 | A-12 | B-2 | 1.0% | A | B | Example |
| B-3 | A-12 | B-3 | 3.8% | A | A | Compar. Ex. |

The samples B-1 and B-2 delivered satisfactory reflectance and scratch resistance in spite of the fact that their plastic substrates were substrates having hard coat layers. Moreover, their indentations in the 2H pencil hardness test were slight and on an excellent level. On the other hand, in the comparative sample B-3, no infiltration layer was formed because the substrate was not in a half-cured state at the time when a coating of the antireflective layer forming composition was applied, and hence deterioration in reflectance was caused.

In the next place, the following experiment was made on the second aspect in the invention.

(Making of Substrate with Hard Coat Layer)

To a cellulose triacetate film (TDH60UF, a product of Fujifilm Holdings Corporation), a coating of hard coat layer-forming coating solution having the following composition was applied, and then cured by being irradiated with ultraviolet light from an air-cooled metal halide lamp at an irradiation dose of 120 mJ/cm² as a purge of air with nitrogen was conducted, thereby forming a 8 μm-thick hard coat layer. In this manner, a substrate with the hard coat layer was made.

<Composition of Hard Coat Layer-Forming Coating Solution>

(1) Hard Coat Layer α

| PET-30 | 21.4 parts by mass |
|---|---|
| Viscoat 360 | 21.4 parts by mass |
| IRGACURE 127 | 1.28 parts by mass |
| MEK-ST | 29.3 parts by mass |
| MiBK-ST | 7.3 parts by mass |
| Methyl isobutyl ketone | 6.1 parts by mass |
| Methyl ethyl ketone | 13.2 parts by mass |
| SP-13 | 0.03 parts by mass |

(2) Hard Coat Layer β

| PET-30 | 26.7 parts by mass |
|---|---|
| Viscoat 360 | 26.7 parts by mass |
| IRGACURE 127 | 1.60 parts by mass |
| Methyl isobutyl ketone | 11.25 parts by mass |
| Methyl ethyl ketone | 33.8 parts by mass |

Meanwhile, the hard coat layers α and β formed in the foregoing manners were each subjected to corona treatment at room temperature by using a solid-state corona treatment machine manufactured by Pillar Co. at a power output of 1,500 W and a carrying speed of 3.2 m/min.

(3) Hard Coat Layer γ

| PET-30 | 21.4 parts by mass |
|---|---|
| Viscoat 360 | 21.4 parts by mass |
| IRGACURE 127 | 1.28 parts by mass |
| MEK-ST | 29.3 parts by mass |
| MiBK-ST | 7.3 parts by mass |
| Methyl isobutyl ketone | 6.1 parts by mass |
| Methyl ethyl ketone | 13.2 parts by mass |
| SP-13 | 0.06 parts by mass |

The compounds used in each layer are specifically described below.

PET-30: Mixture of pentaerythritol triacrylate and pentaerythritol tetraacrylate [a product of Nippon Kayaku Co. Ltd.)

Viscoat 360: Triacrylate modified by trimethylolpropane ethylene oxide [a product of Osaka Organic Chemical Industry Ltd.]

IRUGACURE 127: Polymerization initiator [a product of BASF]

MEK-ST: MEK (methyl ethyl ketone) solution of organosilica sol with a solid concentration of 30 mass % and an average particle size of 15 nm [a product of Nissan Chemical Industries, Ltd.]

MiBK-ST: MiBK (methyl isobutyl ketone) solution of organosilica sol with a solid concentration of 30 mass % and an average particle size of 15 nm [a product of Nissan Chemical Industries, Ltd.]

SP-13: MEK solution of a polymer having the following structural formula (mass-average molecular weight of 19,000), the solid concentration of which is 40 mass %;

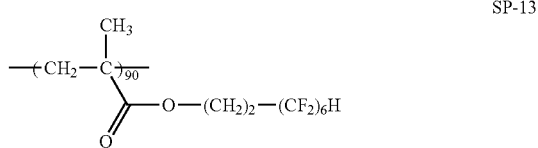

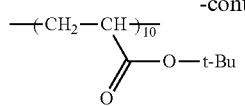

(Preparation of Coating Solution for Forming Antireflective Layer)

Into a mixing tank, varieties of particulate metal oxides, binder resins, solvents and other ingredients were charged so as to constitute the following compositions, stirred for 60 minutes, dispersed for 30 minutes by means of an ultrasonic dispersing machine, and then filtered through a polypropylene filter having a pore diameter of 5 μm. Thus, coating solutions for forming antireflective layers were prepared.

<Varieties of Particulate Metal Oxides]

| | |
|---|---|
| S: KE-P20 (without surface modification) | Ethanol mass ratio M: 1.0 |
| T: KE-P20 (with acrylic-modification) | Ethanol mass ratio M: 0.8 |
| U: KE-P20 (with fluorine-modification) | Ethanol mass ratio M: 0.0 |
| KE-P20 (average primary particle size: 200 nm): Silica (a product of Nippon Shokubai Co., Ltd.) | |

The metallic oxide fine particles T were prepared as follows. The metallic oxide fine particles S in an amount of 2.5 kg was charged into a 20 L of Henschel Mixer provided with a heating jacket (Model FM20J, made by Nippon Coke & Engineering Co., Ltd.). A solution prepared by dissolving 45 g of KBM-5103, a product of Shin-Etsu Chemical Co. Ltd., in 90 g of methyl alcohol was dripped into KE-P20 under stirring, and thereby they were mixed together. Thereafter, heating treatment was performed by raising the temperature of the resulting mixture to 150° C. over a period of about 1 hour with stirring and then keeping the temperature of the mixture at 150° C. for 12 hours. During the heating treatment, adherents to the wall surface were scraped off as a scraping-off device was continuously rotated in the direction opposite to that of its stirring blades. In addition, the adherents were also scraped of by using a spatula as appropriate. After the heating. cooling was performed, and crushing and classification were performed by means of a jet crusher classifier, and thereby acryl-treated silica particles were obtained.

In addition, the metallic oxide fine particles U were prepared as follows. Into a mixing tank, 5 parts by mass of ethanol and 35 parts by mass of the metallic oxide fine particles S were charged, stirred for 10 minutes, and then subjected to ultrasonic dispersion for 60 minutes as the stirring was continued. Further thereto, 5 parts by mass of heptadecafluoro-1,1,2,2-tetrahydrodecyltrimethoxysilane, a product of Gelest, Inc., and 0.1 parts by mass of (ethylacetato)aluminum diisopropoxide, a product of Wako Chemical Ltd., were added, and stirred for 12 hours. Thereafter, the thus treated dispersion was admixed with 100 parts by mass of hexane and left standing for 30 minutes. And therefrom particles were thus precipitated, and the resulting supernatant liquor was disposed of. Such a series of operations for decantation using hexane was carried out at additional 4 times. Thereafter, the precipitates were collected and the solvent was removed with an evaporator. Thus the metallic oxide fine particles U were obtained.

[Preparation of Silica Particle Dispersion]

Into a mixing tank were charged 70 parts by mass of ethanol and 30 parts by mass of the silica particles S, and stirring was carried out for 10 minutes. Thereafter, ultrasonic dispersion was carried out for 30 minutes as the stirring was continued, and thereby a silica particle dispersion S with a solid concentration of 30% was prepared.

Into a mixing tank were charged 35 parts by mass of ethanol, 35 parts by mass of acetone and 30 parts by mass of the silica particles T, and stirring was carried out for 10 minutes. Thereafter, ultrasonic dispersion was carried out for 30 minutes as the stirring was continued, and thereby a silica particle dispersion T with a solid concentration of 30% was prepared. Likewise, a silica particle dispersion U was prepared from 35 parts by mass of ethanol, 35 parts by mass of acetone and the silica particles U.

Meanwhile, every one of average primary particle sizes of the metallic oxide fine particles S, the metallic oxide fine particles T and the metallic oxide fine particles U were 200 nm.

<Composition of Coating Solution for Forming Antireflective Layer>

(1) Binder Resin a (water contact angle: 100°)

| | |
|---|---|
| Dipentaerythritol hexaacrylate (KAYARAD DPHD, a product of Nippon Kayaku Co., Ltd.) | 2.69 parts by mass |
| IRUGACURE 127 | 0.11 parts by mass |
| Methyl ethyl ketone | 72.95 parts by mass |
| FP-3 | 0.10 parts by mass |

(2) Binder Resin b (water contact angle: 96°)

| | |
|---|---|
| Dipentaerythritol hexaacrylate (KAYARAD DPHD, a product of Nippon Kayaku Co., Ltd.) | 2.74 parts by mass |
| IRUGACURE 127 | 0.11 parts by mass |
| Methyl ethyl ketone | 72.95 parts by mass |
| FP-3 | 0.05 parts by mass |

(3) Binder Resin c (water contact angle: 76°)

| | |
|---|---|
| Dipentaerythritol hexaacrylate (KAYARAD DPHD, a product of Nippon Kayaku Co., Ltd.) | 2.78 parts by mass |
| IRUGACURE 127 | 0.12 parts by mass |
| Methyl ethyl ketone | 72.95 parts by mass |

The silica particle dispersions S to U were added in the same amount of 24.15 parts by mass to the binder resins a to c, respectively, and thereby preparing coating solutions for forming antireflective layers.

The fluorine compound FP-3 was produced in accordance with the method disclosed in Japanese Patent Laid-Open Publication No. 2004-163610, and the weight-average molecular weight thereof was found to be 40,000.

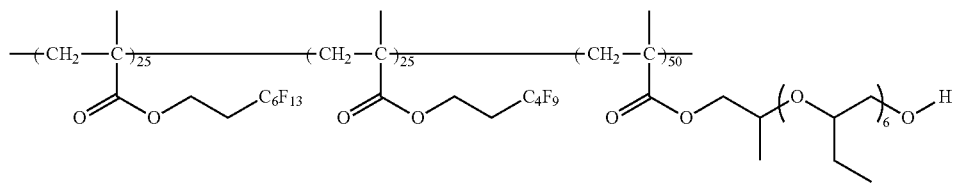

Fluorine compound FP-3

(Preparation of Antireflective Film)
[Forming of Antireflective film Samples No. 1001 to 1021]

A coating of each antireflective layer forming composition was coated to the hard coat layer of the substrate with a hard coat layer by means of a gravure coater, dried at 120° C. for 5 minutes, and then cured by being irradiated with ultraviolet light from an air-cooled metal halide lamp at an irradiation dose of 600 mJ/cm² as a purge of air with nitrogen was conducted so as to achieve an atmosphere with an oxygen concentration lower than 0.1 vol %, thereby forming each of the antireflective films for Examples and Comparative Examples. The varieties of the hard coat layers used herein, those of the binder resins used and those of metallic oxide fine particles are shown in Table 6.

[Forming of Antireflective film Samples No. 1022 to 1024]

A coating of one among the antireflective layer forming compositions as shown in Table 6 was coated to a cellulose acetate film (TDH60UF, a product of FUJIFILM Corporation) by means of a gravure coater, dried at 60° C. for 30 seconds, and then cured by being irradiated with ultraviolet light from an air-cooled metal halide lamp at an irradiation dose of 600 mJ/cm² as a purge of air with nitrogen was conducted so as to achieve an atmosphere with an oxygen concentration lower than 0.1 vol %, and thereby forming one of the antireflective films for Comparative Examples.

(Evaluations of Antireflective Film)

Various characteristics of each antireflective film were evaluated by the following methods, respectively. Results obtained are shown in Table 7.

(Integral Reflectance)

The back side of each antireflective film (the cellulose triacetate film side) was roughened with sandpaper, and then treated with black ink to result in the loss of back-side reflection. Integral reflectance of the antireflective film in this situation was measured at an incident angle of 5° in a wavelength region of 380 nm to 780 nm by means of a spectrophotometer V-550 (made by JASCO Corporation) equipped with an adaptor ARV-474 and an average reflectance was calculated, and therefrom the antireflective property was evaluated.

(Particle Occupancy)

From the direction perpendicular to the surface of each antireflective layer, photographs of the antireflective layer surface were taken in two visual fields under SEM set at 10,000 magnifications, and count of particles constituting the convex portion was taken. For cases where it was difficult to identify particles because particles were covered with the resin incorporated in an antireflective layer, etching treatment was carried out until the particles were laid bare and observation thereof became possible. The particle occupancy was determined by the following expression.

(Particle Occupancy)=$(\pi \times R^2)/4 \times$(particle count)/(total area)$\times 100$(%)

In the above, R represents an average primary size of particles.

(Average Value K of Distance B)

A sample of each antireflective film was cut with a microtome to bare its cross section, and then carbon was evaporated onto the cross section. Photographs of the thus treated cross section were taken under a scanning electron microscope (SEM) at a magnification of 50,000. On each of 100 spots at the interface formed by air and the sample on the thus obtained photographs was measured a distance B between the middle of the apexes of adjacent convex portions and the concave portion, and therefrom an average value K of the distance B was calculated. Further, the standard deviation σ indicating variations in the measured values of the distance B was worked out.

(Pencil Hardness Test)

The pencil hardness evaluation described in JIS K5400 was performed. Each of the antireflective film samples was subjected to moisture conditioning for 3 hours at a temperature of 25° C. and a humidity of 60% RH, and then on the antireflective layer surface of each sample was done the test using a test pencil as defined by JIS S6006. And evaluation was made on the basis of the following criteria.

A: No indentations are seen after the test
B: Slight indentations are seen after the test, but none of them constitutes a matter of concern
C: Serious indentations are seen after the test, and they are conspicuous.

TABLE 6

| Sample No. | | Metallic Oxide Fine Particle | Ethanol Mass Ratio M for Particulate Metal Oxide | Binder Resin | Water Contact Angle P to Binder Resin | Hard Coat Layer | Water Contact Angle L to Hard Coat Layer |
|---|---|---|---|---|---|---|---|
| 1001 | Example | S | 1 | a | 100° | α | 9° |
| 1002 | Comparative Example | S | 1 | a | 100° | β | 33° |
| 1003 | Comparative Example | S | 1 | a | 100° | γ | 80° |
| 1004 | Example | S | 1 | b | 96° | α | 9° |
| 1005 | Comparative Example | S | 1 | b | 96° | β | 33° |
| 1006 | Comparative Example | S | 1 | b | 96° | γ | 80° |
| 1007 | Example | T | 0.8 | a | 100° | α | 9° |
| 1008 | Example | T | 0.8 | a | 100° | β | 33° |
| 1009 | Comparative Example | T | 0.8 | a | 100° | γ | 80° |

TABLE 6-continued

| Sample No. | | Metallic Oxide Fine Particle | Ethanol Mass Ratio M for Particulate Metal Oxide | Binder Resin | Water Contact Angle P to Binder Resin | Hard Coat Layer | Water Contact Angle L to Hard Coat Layer |
|---|---|---|---|---|---|---|---|
| 1010 | Example | T | 0.8 | b | 96° | α | 9° |
| 1011 | Example | T | 0.8 | b | 96° | β | 33° |
| 1012 | Comparative Example | T | 0.8 | b | 96° | γ | 80° |
| 1013 | Example | U | 0 | a | 100° | α | 9° |
| 1014 | Example | U | 0 | a | 100° | β | 33° |
| 1015 | Comparative Example | U | 0 | a | 100° | γ | 80° |
| 1016 | Example | U | 0 | b | 96° | α | 9° |
| 1017 | Example | U | 0 | b | 96° | β | 33° |
| 1018 | Comparative Example | U | 0 | b | 96° | γ | 80° |
| 1019 | Comparative Example | U | 0 | c | 76° | α | 9° |
| 1020 | Comparative Example | U | 0 | c | 76° | β | 33° |
| 1021 | Comparative Example | U | 0 | c | 76° | γ | 80° |
| 1022 | Comparative Example | S | 1 | a | 100° | absent | — |
| 1023 | Comparative Example | T | 0.8 | a | 100° | absent | — |
| 1024 | Comparative Example | U | 0 | a | 100 | absent | — |

TABLE 7

| | | | | Evaluation Result | | |
|---|---|---|---|---|---|---|
| Sample No. | | Reflectance | Particle Occupancy | Average Value K of B | Standard Deviation σ of B | Hardness of Antireflective film |
| 1001 | Example | 1.9% | 72% | 152 | 38 | A |
| 1002 | Compar. Ex. | 2.1% | 72% | 85 | 25 | B |
| 1003 | Compar. Ex. | 2.5% | 72% | 54 | 54 | B |
| 1004 | Example | 1.8% | 72% | 120 | 28 | B |
| 1005 | Compar. Ex. | 2.3% | 72% | 38 | 48 | B |
| 1006 | Compar. Ex. | 2.4% | 72% | 97 | 64 | B |
| 1007 | Example | 1.5% | 72% | 154 | 35 | A |
| 1008 | Example | 1.7% | 72% | 136 | 39 | A |
| 1009 | Compar. Ex. | 2.6% | 72% | 102 | 66 | B |
| 1010 | Example | 1.6% | 72% | 161 | 28 | A |
| 1011 | Example | 1.8% | 72% | 148 | 31 | B |
| 1012 | Compar. Ex. | 2.4% | 72% | 97 | 43 | B |
| 1013 | Example | 1.1% | 72% | 179 | 27 | A |
| 1014 | Example | 14% | 72% | 172 | 35 | A |
| 1015 | Compar. Ex. | 2.2% | 72% | 123 | 74 | A |
| 1016 | Example | 1.2% | 72% | 157 | 35 | B |
| 1017 | Example | 1.5% | 72% | 123 | 21 | B |
| 1018 | Compar. Ex. | 2.1% | 72% | 156 | 45 | B |
| 1019 | Compar. Ex. | 2.2% | 72% | 154 | 54 | A |
| 1020 | Compar. Ex. | 2.3% | 72% | 153 | 68 | A |
| 1021 | Compar. Ex. | 2.4% | 72% | 187 | 65 | A |
| 1022 | Compar. Ex. | 1.7% | 72% | 172 | 29 | C |
| 1023 | Compar. Ex. | 1.3% | 72% | 168 | 33 | C |
| 1024 | Compar. Ex. | 1.2% | 72% | 192 | 24 | C |

As shown in Tables 6 and 7, the samples No. 1001 to 1021 were antireflective films provided with antireflective layers having moth-eye structures on their respective hard coat layers, and they were therefore capable of having high hardness. Moreover, each of the samples Nos. 1001, 1004, 1007, 1008, 1010, 1011, 1013, 1014, 1016 and 1017 had its individual average value K for the distance B and standard deviation σ of B in the ranges specified respectively by the invention, and hence showed low reflectance as compared with the samples as Comparative Examples.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimed is:

1. An antireflective film, comprising:
 a plastic substrate;
 an infiltration layer; and
 an antireflective layer containing metallic oxide fine particles with an average primary particle size of 150 nm to 250 nm and a viscosity increasing compound, in this order,
 wherein the infiltration layer and the antireflective layer are in contact with each other, wherein the infiltration layer and the antireflective layer each contains a same polymer containing a (meth) acrylate compound having a molecular weight of 400 or less, wherein the antireflective layer has a moth-eye structure including an uneven shape formed by the metallic oxide fine particles, and wherein all of the metallic oxide fine particles are solid particles.

2. The antireflective film according to claim 1,
wherein the antireflective layer further contains a binder resin.

3. The antireflective film according to claim 1,
wherein the viscosity increasing compound has a function of a binder resin as well.

4. The antireflective film according to claim 1,
wherein the infiltration layer further contains the viscosity increasing compound.

5. The antireflective film according to claim 4,
wherein a concentration of the viscosity increasing compound in the infiltration layer is lower than one in the antireflective layer.

6. The antireflective film according to claim 1,
wherein the uneven shape of the antireflective layer satisfies a B/A ratio of 0.6 or more,
wherein A represents a distance between apexes of adjacent convex portions, and
B represents a distance between a concave portion and a middle between apexes of adjacent convex portions.

7. The antireflective film according to claim 6,
wherein a distribution of the distance A has a half width of 200 nm or less.

8. The antireflective film according to claim 1,
wherein the viscosity increasing compound is a urethane compound.

9. The antireflective film according to claim 8,
wherein the urethane compound is a four or more functional urethane (meth)acrylate.

10. The antireflective film according to claim 1,
wherein the viscosity increasing compound has a viscosity of 15 to 100,000 mPa·s at 100° C.

11. The antireflective film according to claim 1,
wherein the plastic substrate is a substrate containing cellulose acylate.

12. The antireflective film according to claim 1,
wherein the metallic oxide fine particles are silica particles.

13. The antireflective film according to claim 1,
wherein all of the metallic oxide fine particles have an indentation hardness of 400 MPa or more.

14. The antireflective film according to claim 1,
wherein the metallic oxide fine particles consist of pyrogenic silica particles surface-modified with a compound having a (meth)acryloyl group.

15. A polarizing plate comprising:
a polarizer; and
at least one protective film for protecting the polarizer,
wherein the at least one protective film is the antireflective film according to claim 1.

16. A cover glass comprising, as a protective film, the antireflective film according to claim 1.

17. An image display device comprising the antireflective film according to claim 1.

18. An antireflective film, comprising:
a substrate;
a hard coat layer;
an infiltration layer; and
an antireflective layer containing metallic oxide fine particles with an average primary particle size of 150 nm to 380 nm and a binder resin, in this order, wherein the infiltration layer and the antireflective layer are in contact with each other, wherein the infiltration layer and the antireflective layer each contains a same polymer containing a (meth) acrylate compound having a molecular weight of 400 or less;

wherein the antireflective layer has a moth-eye structure constituted by an uneven shape formed by the metallic oxide fine particles, wherein a particle occupancy at a surface of the antireflective layer is 40% to 90%, wherein the uneven shape satisfies formulae (2) and (3):

$$R/2 \leq K \leq 9R/10 \qquad \text{formula (2)}$$

$$\sigma \leq 40 \qquad \text{formula (3)},$$

wherein K represents an average value of a distance B between a middle of apexes of adjacent convex portions and a concave portion, σ represents a standard deviation of a distribution of the distance B, and R represents an average primary particle diameter of the metallic oxide fine particles, wherein all of the metallic oxide fine particles are solid particles.

19. The antireflective film according to claim 18, which satisfies formulae (4) and (5):

$$-120M+130 \geq L \qquad \text{Formula (4)}$$

$$L \leq 50° \qquad \text{Formula (5)}$$

wherein when the metallic oxide fine particles are dispersed in 11 kinds of ethanol/acetone mixed solvent varying a mass ratio of ethanol to a whole mixed solvent from 0 to 1 by 0.1, M represents a mass ratio of ethanol to the whole mixed solvent in a mixed solvent in which precipitation of the metallic oxide fine particles is the slowest, and L represents a water contact angle to the hard coat layer.

20. The antireflective film according to claim 18,
wherein a water contact angle to the binder resin in the antireflective layer is 90° or more.

21. The antireflective film according to claim 18,
wherein the metallic oxide fine particles are metallic oxide fine particles surface-modified with a compound having at least one substituent selected from the group consisting of an alkyl group, a (meth)acryloyl group, organosiloxane and a fluorine atom.

22. The antireflective film according to claim 18,
wherein the metallic oxide fine particles are silica particles.

23. The antireflective film according to claim 18,
wherein the metallic oxide fine particles are pyrogenic silica particles.

24. A polarizing plate comprising:
a polarizer; and
at least one protective film for protecting the polarizer,
wherein the at least one protective film is the antireflective film according to claim 18.

25. A cover glass comprising, as a protective film, the antireflective film according to claim 18.

26. An image display device comprising the antireflective film according to claim 18.

27. A method of manufacturing an antireflective film including a plastic substrate, an infiltration layer, and an antireflective layer containing metallic oxide fine particles with an average primary particle diameter of 50 nm to 250 nm and a viscosity increasing compound, in this order, wherein the antireflective layer has a moth-eye structure constituted by an uneven shape formed by the metallic oxide fine particles at a surface opposite to the interface with the plastic substrate, the method comprising:

coating a composition for forming the antireflective layer, containing a viscosity increasing compound, a (meth) acrylate compound having a molecular weight of 400 or lower, metallic oxide fine particles with an average primary particle diameter of 50 nm to 250 nm, and a solvent, on the plastic substrate or a functional layer provided on the plastic substrate;

infiltrating the (meth)acrylate compound into the plastic substrate or the functional layer on the plastic substrate to protrude the metallic oxide fine particles from the surface opposite to the interface with the plastic substrate; and polymerizing the (meth)acrylate compound to form the infiltration layer containing the (meth)acrylate compound and the antireflective layer having the moth-eye structure formed by the metallic oxide fine particles.

28. The method of manufacturing the antireflective film according to claim 27, wherein the composition for forming the antireflective layer has a viscosity of 15 to 100 mPa·s at 100° C.

* * * * *